US010353685B2

(12) United States Patent
Patton et al.

(10) Patent No.: US 10,353,685 B2
(45) Date of Patent: *Jul. 16, 2019

(54) AUTOMATED MODEL MANAGEMENT METHODS

(71) Applicant: Banjo, Inc., Park City, UT (US)

(72) Inventors: Damien Patton, Park City, UT (US); Tilmann Bruckhaus, Redwood City, CA (US)

(73) Assignee: Banjo, Inc., Park City, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 16/239,181

(22) Filed: Jan. 3, 2019

(65) Prior Publication Data

US 2019/0171428 A1 Jun. 6, 2019

Related U.S. Application Data

(63) Continuation of application No. 16/047,932, filed on Jul. 27, 2018, now Pat. No. 10,209,974.

(60) Provisional application No. 62/594,459, filed on Dec. 4, 2017.

(51) Int. Cl.
G06N 99/00 (2019.01)
G06N 5/04 (2006.01)
G06F 17/30 (2006.01)
G07F 17/32 (2006.01)
G06F 8/60 (2018.01)
G06N 20/00 (2019.01)

(52) U.S. Cl.
CPC .............. *G06F 8/60* (2013.01); *G06N 20/00* (2019.01)

(58) Field of Classification Search
CPC .......... G06N 20/00; G06N 5/04; G06N 7/005; G06F 16/254; G06F 16/24578; G06F 16/285; G06F 16/444; G06F 8/60; G06F 3/0202; G06F 3/0216; G06F 11/08; G06F 11/3688; G06F 21/566; A61B 5/14503; A61B 5/1451; A61B 5/14517; C12N 5/061; C12N 5/0612

See application file for complete search history.

(56) References Cited

U.S. PATENT DOCUMENTS 7,630,950 B2 * 12/2009 Wang ..................... G06N 20/00 706/48
9,165,328 B2 * 10/2015 Aggarwal .............. G06Q 50/01
9,355,088 B2 5/2016 Simard et al.
9,672,474 B2 6/2017 Dirac et al.
9,942,085 B2 * 4/2018 Tsagkaris ................ H04B 7/04

(Continued)

OTHER PUBLICATIONS

Seeliger et al., Detecting Concept Drift in Processes using Graph Metrics on Process Graphs, 10 pages (Year: 2017).*

(Continued)

*Primary Examiner* — Thuy Dao
(74) *Attorney, Agent, or Firm* — Michael B. Dodd

(57) ABSTRACT

The method for model management includes, within a testing platform: building candidate model(s), validating the candidate model(s), and selectively deploying the candidate model(s) into a production environment. The method can optionally include, within a production environment: detecting a class instance based on the raw data using deployed model(s) within the production environment, and transmitting a notification to an endpoint associated with the detected class.

20 Claims, 12 Drawing Sheets

(56) References Cited

U.S. PATENT DOCUMENTS

| | | | |
|---|---|---|---|
| 9,972,014 B2 | 5/2018 | McCord et al. | |
| 10,003,605 B2 | 6/2018 | Muddu et al. | |
| 10,102,480 B2 | 10/2018 | Dirac et al. | |
| 2008/0097936 A1* | 4/2008 | Schmidtler | G06N 20/00 706/12 |
| 2008/0133434 A1* | 6/2008 | Asar | G06N 20/00 706/12 |
| 2015/0134575 A1 | 5/2015 | Traupman et al. | |
| 2015/0317589 A1* | 11/2015 | Anderson | G06Q 10/08 705/7.25 |
| 2015/0379429 A1 | 12/2015 | Lee et al. | |
| 2015/0379430 A1 | 12/2015 | Dirac et al. | |
| 2016/0071025 A1* | 3/2016 | Brand | G06N 5/02 706/12 |
| 2016/0110657 A1 | 4/2016 | Gibiansky et al. | |
| 2016/0379132 A1 | 12/2016 | Jin et al. | |
| 2017/0063906 A1* | 3/2017 | Muddu | G06F 16/254 |
| 2017/0098161 A1 | 4/2017 | Ellenbogen et al. | |
| 2017/0206469 A1* | 7/2017 | Das | G06N 5/022 |
| 2018/0082213 A1 | 3/2018 | McCord | |
| 2018/0114334 A1 | 4/2018 | Desai et al. | |
| 2018/0293511 A1* | 10/2018 | Bouillet | H04L 67/12 |

OTHER PUBLICATIONS

Rainer et al., Self-Organized Inter-Destination Multimedia Synchronization for Adaptive Media Streaming, 10 pages (Year: 2014).*

Kuzey et al., Building a Knowledge Base of Events, 2014, pp. 103-106.

Zwieten et al., Observer Design for a Class of Piecewise Affine Hybrid Systems, 2013, pp. 153-162.

Gama et al., A Survey on Concept Drift Adaptation, Mar. 2014, 37 pages, vol. 46, No. 4, Article 44, ACM Computing Surveys.

Non-Final Office Action received in U.S. Appl. No. 16/047,932, dated Oct. 11, 2018, 11 pages.

* cited by examiner

AUTOMATED MODEL MANAGEMENT METHODS

CROSS-REFERENCE TO RELATED APPLICATIONS

This application is a continuation of U.S. patent application Ser. No. 16/047,932 filed 27 Jul. 2018, which is incorporated in its entirety by this reference. That application claims the benefit of U.S. Provisional Application No. 62/594,459 filed 4 Dec. 2017, which is incorporated in its entirety by this reference.

This application is related to U.S. application Ser. No. 15/902,935 filed 22 Feb. 2018, which is a continuation of U.S. application Ser. No. 15/250,735, filed 29 Aug. 2016, which is a continuation-in-part of U.S. application Ser. No. 14/971,607 filed 16 Dec. 2015 which claims the priority of U.S. Provisional Application No. 62/093,749 filed 18 Dec. 2014, which are incorporated in their entireties by this reference. US Application Ser. No. 15/250,735 is also a continuation-in-part of U.S. application Ser. No. 14/882,318 filed 13 Oct. 2015, which claims the priority of U.S. Provisional Application No. 62/063,078 filed 13 Oct. 2014 and is a continuation-in-part of US application Ser. No. 14/643,958 filed 10 Mar. 2015. Application Ser. No. 14/643,958 is a continuation-in-part of US application Ser. No. 14/574,966, filed 18 Dec. 2014, which claims the benefit of U.S. Provisional Application No. 61/918,126, filed 19 Dec. 2013, U.S. Provisional Application No. 62/060,407, filed 6 Oct. 2014, and U.S. Provisional Application No. 62/006,632, filed 2 Jun. 2014. Application Ser. No. 14/643,958 is also a continuation-in-part of application Ser. No. 14/501,436 filed 30 Sep. 2014, which is a continuation-in-part of application Ser. No. 14/043,479, filed 1 Oct. 2013, which claims the benefit of U.S. Provisional Application No. 61/709,103, filed 2 Oct. 2012, U.S. Provisional Application No. 61/782,687, filed 14 Mar. 2013, and U.S. Provisional Application No. 61/784,809, filed 14 Mar. 2013. Application Ser. No. 14/501,436 also claims the benefit of U.S. Provisional Application No. 61/885,322, filed 1 Oct. 2013, U.S. Provisional Application No. 61/918,126, filed 19 Dec. 2013, and U.S. Provisional Application No. 62/006,632, filed 2 Jun. 2014. All of the aforementioned applications are incorporated herein in their entireties by this reference.

TECHNICAL FIELD

This invention relates generally to the computing field, and more specifically to a new and useful method for model management in the computing field.

BACKGROUND

Machine learning systems conventionally train untrained algorithms with data to generate models for subsequent data analyses, such as detections, predictions, and decision making. However, fully- or partially-manual model generation, validation, and deployment can be extremely cost- and time-intensive, particularly when the number of available algorithms and the volume of training data continues to grow at an increasingly rapid pace. For example, a full feedback loop of gathering labeled training data, building new models, evaluating the new models, and pushing the models into production oftentimes takes months.

Thus, there is a need in the computing field to create a new and useful system for model management and method of use. This invention provides such new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
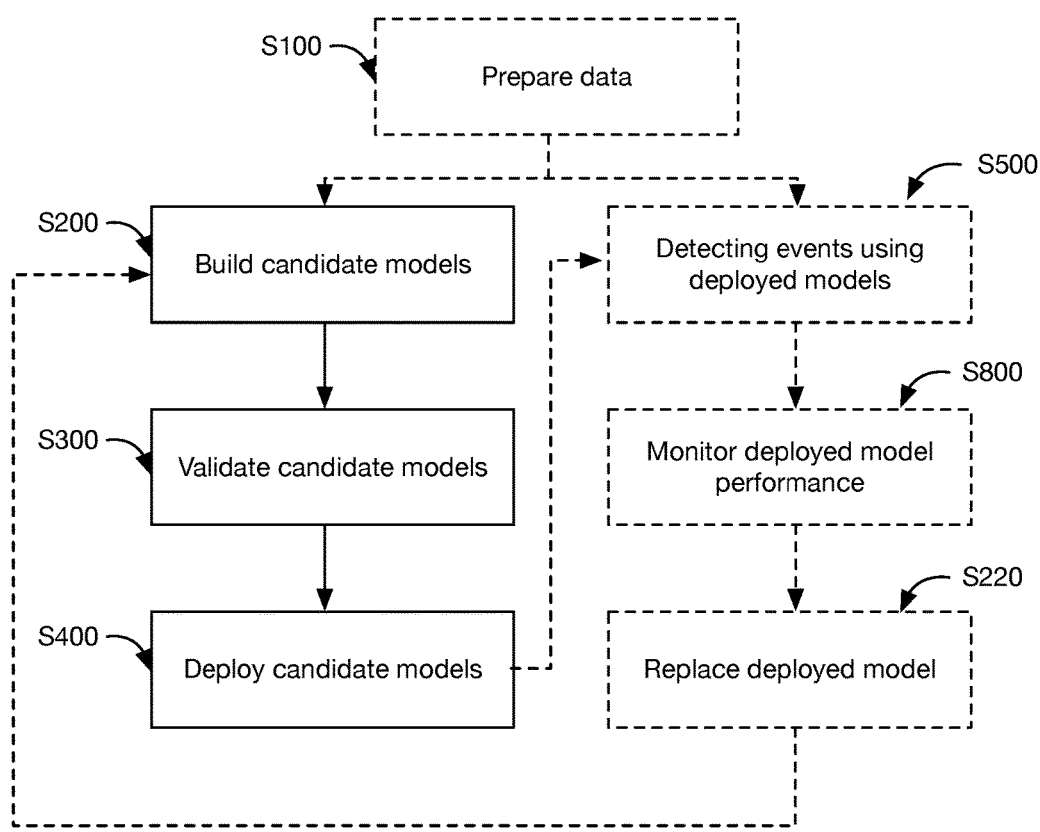
FIG. 1 is a schematic representation of the method.

As shown in FIG. 1, the method for model management includes, within a testing platform: building candidate model(s) S200, validating the candidate model(s) S300, and selectively deploying the candidate model(s) into a production environment S400. The method functions to automatically generate (e.g., train), test, and deploy new models into the production environment.

In one variation, the method generates, validates, and deploys event detection models that detect events using real-world data. In particular, the method generates and validates new, candidate event detection models for a given event class (or set thereof) within a testing platform, and deploys candidate event detection models that satisfy deployment conditions into the production environment for use with real-world data. The method can concurrently detect events (e.g., of the same or different class) with prior event detection models that were previously deployed within the production environment while the new event detection models are being generated and/or validated. The prior event detection models preferably detect events in real- or near-real time (e.g., as the data is being received by the system, as the data is being generated by a data source, etc.), but can alternatively or additionally detect events asynchronously (e.g., after a delay, detect historical events). The new event detection model(s) can be trained and/or validated on the same raw data used by the prior event detection models, or be trained and/or validated on different data. However, the method can be applied to any suitable method and/or application.

An event is preferably an uncommon occurrence (e.g., anomalous deviation from a historical norm or pattern) for a geographic region, but can be otherwise defined. The event can be associated with event parameters, such as: a start time, an end time, an event duration, an event location (e.g., a geographic location, region, or set thereof associated with the event; the geographic extent of event-associated raw data), an event series (e.g., a set of secondary events associated with the event, wherein each of the secondary events can be associated with an occurrence time relative to the event time), subsequent events (e.g., secondary events that are associated with the detected event, whether by correlation or causation), prior events (e.g., secondary events that are associated with the detected event, which can be correlated with or cause the detected event), event data (e.g., raw data used to detect event occurrence), an event content stream (e.g., a time series of event-related data), or any other suitable parameter.

The event is preferably detected by an event detection model associated with the event class, but can be detected by a general event detection model, or detected by any suitable system. The event can be detected: when a feature frequency deviates from a historical baseline beyond a threshold amount (e.g., exceeds or falls below the historical baseline); when the probability of the detected combination of features or labels falls below a threshold probability (e.g., for the geographic region, example shown in FIG. 1*i*); when the frequency of the detected combination of features or labels exceeds a threshold frequency (e.g., for the geographic region); when the raw data generated within a predetermined time frame have a predetermined combination of labels associated with the event class; when the event detection model classifies the set of features, data labels, and/or underlying data as one of a set of event classes (e.g., wherein the event detection model is a multi-label classifier); when the event detection model outputs a detection of an instance of the event class (e.g., wherein the event detection model is a binary classifier); or can be otherwise identified.

The event can optionally be associated with one or more endpoints, wherein notifications can be sent to the endpoints when new instances of the event (e.g., new instances of the event class) are detected. The endpoints are preferably users, but can alternatively be computing systems, display devices, or any suitable endpoint. The endpoints preferably subscribe to the event class (e.g., receive push notifications when the event is detected), but can additionally or alternatively query the system for detected instances of the event class. The endpoints can generate endpoint data streams based on the event notification (e.g., convert the event notification into a report, publish data from the event content stream to their content stream, etc.), wherein the endpoint data streams can be ingested by the method and/or system (e.g., as a source data stream) to validate the event detection model, determine a conversion rate, or otherwise used.

2. Benefits

This method can confer several benefits over conventional systems, which manually generate, validate, and deploy models.

First, the method can be faster than conventional systems, particularly at scale, which can be particularly beneficial in time-dependent applications, such as event detection (e.g., wherein the detection class needs to be detected in real- or near-real time). Second, the method enables different models to be concurrently generated, tested, deployed, monitored, and updated for different: detection classes, demographics, timeframes, geographic regions, and/or other parameter. This parallelization was previously impossible in manual training, which necessitated serial processing and therefore precluded concurrent model generation at scale, particularly for models that depended on or were related to other models (e.g., when a model's output feeds into another model; when a model is a subset of another model). Third, the method can dynamically utilize new machine learning algorithms or methodologies as they are made available. Fourth, the method can be more cost effective than conventional systems, since the method can dynamically allocate different processes (e.g., sub-steps of the method) to different resources at different times to optimize for cost, speed, or other performance parameters.

In some variants, the inventors have further discovered that concept drift (e.g., changes in a target concept) can obsolete prior models, since the prior models were trained on historic training data that lacked the drifted concept (e.g., changed concept). For example, a car crash detector can fail to detect a car crash involving a newer vehicle, since the precursor labeling model or detection model itself can fail to recognize the newer vehicle as a vehicle. In a second example, event detectors that rely on social networking content (e.g., social media posts) can fail to detect an event because of changes in slang. Conventionally, this necessitated periodic manual monitoring, training data identification, training data labeling, and model retraining, which became problematic at scale. Furthermore, since the models were being manually monitored, the model may have been outdated for a substantial time period before actual review, resulting in missed event detections in the interim. To further compound the issue, as the rate of technological development and communication increases, the rate of concept drift can oftentimes increase, nearly obviating the newly-generated manual model by the time it is deployed into production. By using an automated or semi-automated model management system, the system can be more responsive to concept drift due to: faster data ingestion and processing; better system monitoring and response; and parallel model building, evaluation, and deployment at scale.

3. System

Figure 2:
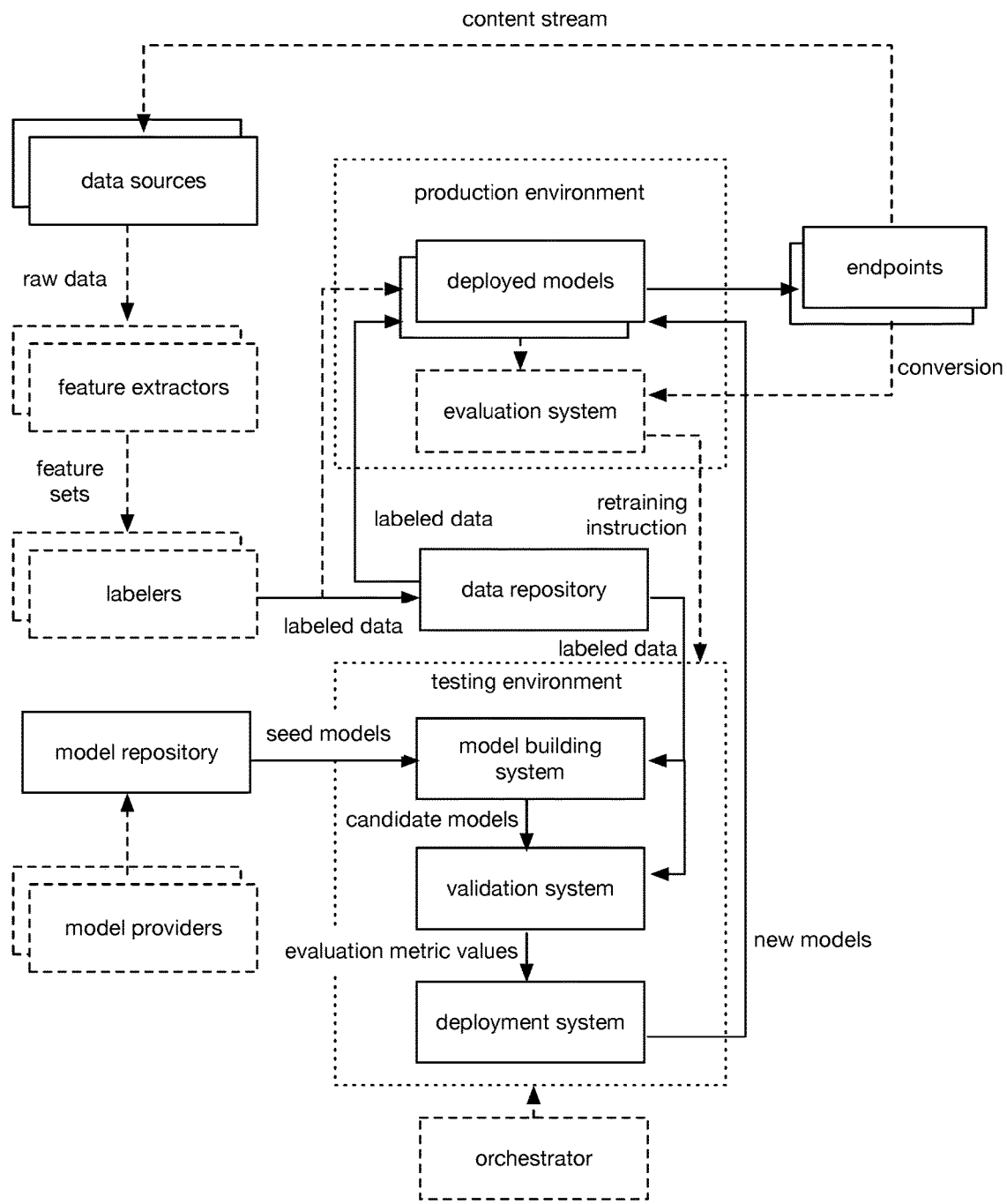
FIG. 2 is a schematic representation of an example system with data flow.

The method is preferably performed by a system for model management, but can alternatively be performed by any suitable system. As shown in FIG. 2, the system for model management can include a testing platform, including: a data ingestion system, a model building system, a validation system, and a deployment system. The system can optionally include: a production environment, an evaluation system, a curation system, an orchestration system, or any other suitable sub-system.

The system is preferably hosted by and/or run on local processing systems (e.g., on-premises processing systems), but can alternatively be hosted by and/or run on remote processing systems (e.g., server systems, such as AWS™). The processing systems can include: CPUs, GPUs, TPUs, microprocessors, ASICs, or any other suitable chipset or hardware. In a hybridized system (e.g., mixed local and remote system, mixed chipset systems, etc.), different resources can be selected (e.g., by the orchestrator) and used based on: availability (e.g., current or anticipated), resource capabilities, cost, or any other suitable parameter. In one example, stable computing loads, such as executing the production environment, can be hosted locally, while load spikes or latency-dependent processes can be allocated to the remote computing system.

The testing platform functions to provide an isolated environment in which new models can be generated and validated. The testing platform can include: a data ingestion system, a model building system, a validation system, and a deployment system, but can additionally or alternatively include any other suitable subsystem. The testing platform is preferably separate from the production environment, but can be connected to the production environment (e.g., via the deployment system) and/or share resources with the production environment (e.g., the data ingestion system, the seed model repository, the validation system, etc.). Alternatively, the testing platform can include the production environment, overlap with the production environment, or be otherwise related to the production environment.

The data ingestion system functions to receive and process raw data from one or more data providers (e.g., data sources) into format(s) that can be ingested by the models and/or machine learning algorithms.

The system can include one or more data ingestion systems. The system can include: a single data ingestion system for all data sources; individual data ingestion systems for individual data sources; a data ingestion system for a data modality (e.g., type or domain); separate data ingestion systems for the production environment and testing platform; separate data ingestion systems for each model; separate data ingestion systems for each geographic region or time period; or any suitable number of data ingestion systems.

The data ingestion system preferably includes a data extraction system and a data preparation system, but can additionally or alternatively include any suitable subsystem.

The data extraction system functions to extract the raw data from the data source, and can provide the raw data to the provider, the production environment, the testing platform, or other endpoint(s). The data extraction system preferably subscribes to the data providers and receive a pushed stream of raw data from the data providers, but can alternatively periodically query the data providers or otherwise obtain the raw data from the data providers. The data extraction system can receive data continuously, in real- or near-real time (e.g., as the data is being generated or transmitted from the data source), in batches, or at any suitable time.

The data preparation system functions to prepare and clean (e.g., organize, annotate) the raw data. The data preparation system can include one or more: feature extractors, labelers, data set builders, or any suitable subsystem.

The feature extractors function to extract one or more data features from the raw data. In variations, this can function to reduce the dimensionality of the raw data to a standardized data format (e.g., an array). The feature extractors can be binary detectors, non-binary detectors, or otherwise configured. The feature extractors are preferably specific to a domain (e.g., computer vision, acoustic, text, etc.), and selectively applied based on the content of the raw data (e.g., computer vision feature extractors applied to images or video; text feature extractors applied to text; etc.), but can alternatively or additionally be specific to or selectively applied based on: the data source, the metadata associated with the raw data, the geographic location, or otherwise used. The system preferably includes a feature extractor for each domain, but can additionally or alternatively include multiple feature extractor variants for each domain, wherein the feature extractor variants can be A/B tested, be used for data with different characteristics (e.g., metadata), or otherwise used.

Examples of features include: edge detection, corner detection, blob detection, SIFT, ridge detection, curvature, motion detection (e.g., optical flow), thresholding, Hough transforms, template matching, color (e.g., using DCD, SCD, CSD, CLD, GOF, etc.), texture (e.g., HTD, TBD, EHD), shape (e.g., RSD, CSD, 3D-SD), motion (e.g. using MAD, CMD, MTD, WMD, PMD, etc.), HOG values, location (e.g., using RLD, STLD, etc.), text categories, text clustering, concepts, entities, taxonomies, document summarization, word count, entity relations, patterns, frequency distributions, quantitative text parameters, MFCC, temporal features, and volume. However, any suitable feature can be extracted and used by the system.

The labelers function to label the raw data or respective features. The labels can be used to identify the pieces of raw data (or respective features) that should be fed into a model or learning algorithm, or otherwise used. The labelers can ingest: the raw data, the feature set extracted from the raw data, multiple feature sets, or any suitable information. The labels preferably give higher-level context to the feature set extracted from the raw data; however, the labels can be otherwise related to the feature values. The labelers are preferably globally applicable, but can additionally or alternatively be specific to a domain, the modality of the raw data, the data source, a data pool, a detected class, the metadata associated with the raw data, the geographic location, or otherwise utilized. The system can include one or more labelers for each population segmentation (e.g., modality, geographic region, etc.). Examples of labelers include: detectors, classifiers, dimensionality reducers (e.g., canonical correlation analysis (CCA), factor analysis, feature extraction, feature selection, independent component analysis (ICA), linear discriminant analysis (IDA), multidimensional scaling (MDS), non-negative matrix factorization (NMF), partial least squares regression (PLSR), principal component analysis (PCA), principal component regression (PCR), projection pursuit, Sammon mapping, t-distributed stochastic neighbor embedding (T-SNE)), or any other suitable labeler. Examples of labels include: bounding boxes, object pose, object profile, object location, object trajectory, object class (e.g., vehicle, vehicle's make, vehicle model, etc.), sentiment (e.g., sentiment graph value), acoustic source, acoustic location, or any suitable label.

The labelers can be generated using the method disclosed herein (e.g., wherein the labeler is treated as a model, wherein the data pool includes both true positives for the label and true negatives for the label), or be otherwise generated. In one example, generating the labelers can include: extracting secondary features from secondary training data, wherein the secondary training data is pre-associated with the label (e.g., a true positive and/or true negative); and training a seed labeling model to algorithmically arrive at the label. However, the labelers can be otherwise generated.

In a first variation, the labeler can be a binary labeler that outputs a binary classification of whether or not the data should be associated with the label. In this variation, the system includes a different labeler for each potential label.

In a second variation, the labeler can be a multi-label classifier that outputs one or more labels for the data (e.g., one or more of a plurality of labels that can be output by the classifier). In this variation, the system can include a single labeler, a labeler for each domain, or any suitable number of labelers. However, the labeler can be otherwise constructed.

The data set builder functions to build data sets for model training, testing, and/or operation (e.g., in the production environment). The generated data sets preferably include raw data, but can alternatively or additionally include the feature sets, labels, or any other suitable information. The system can include: a single data set builder for all models, a separate data set builder for each detected class, multiple data set builders for each detected class, or any suitable number of data set builders. The data set builder can optionally segment (e.g., split) the raw data into one or more training data sets or testing data sets. The data set builder can be: global, be specific to one or more of a given class, domain, modality, geographic location, timeframe, demographic, data source, or other population segment, or otherwise constructed.

Figure 6:
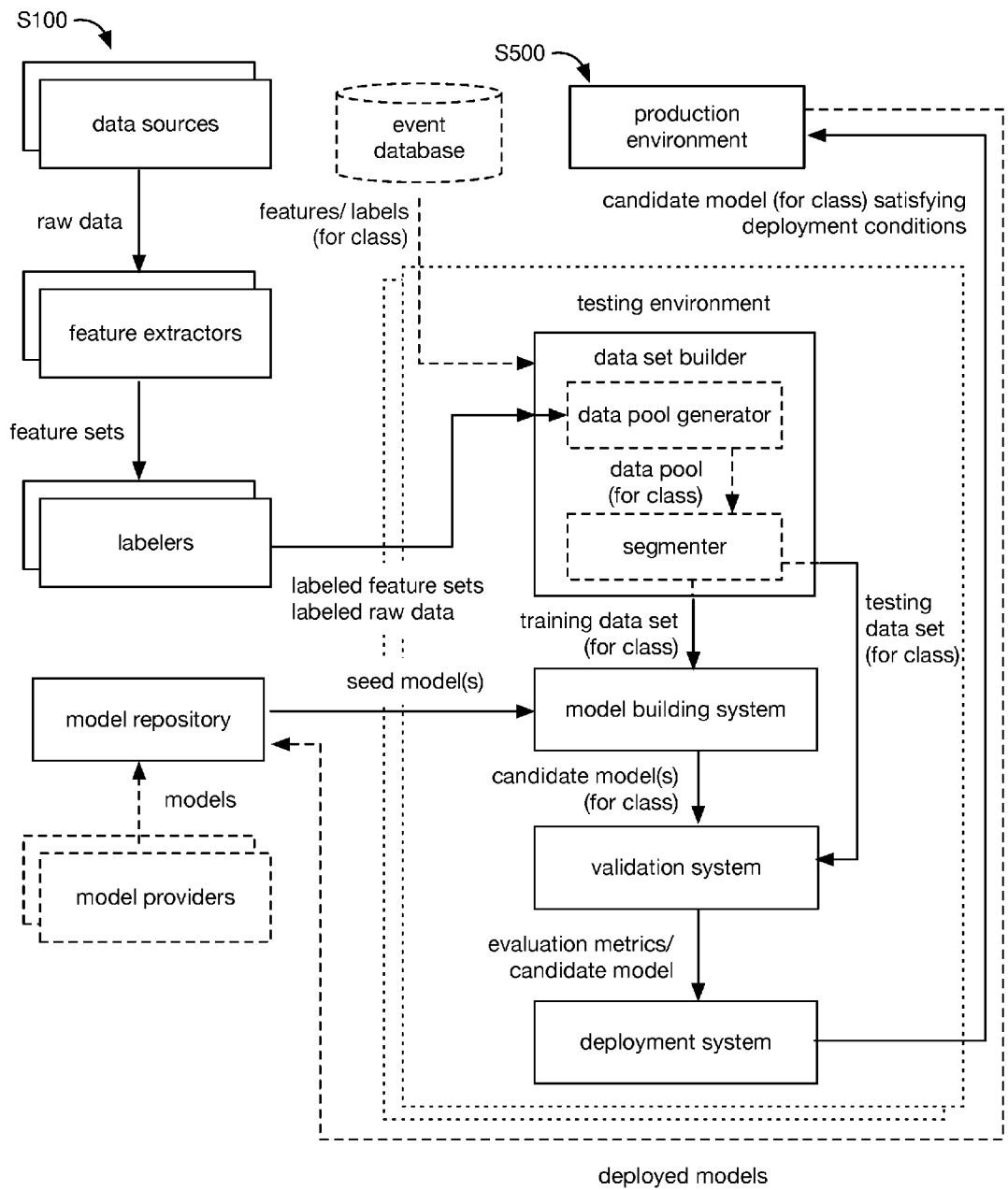
FIG. 6 is an example of building a new model for a detection class.

In one variation, the data set builder: receives the event class for which a new model is to be built (e.g., from the builder); identifies labels associated with the detected class (e.g., from the production environment model database, from an event class database, etc.), wherein the label-detected class associations can be known a priori (e.g., determined from prior models for the detected class, example shown in FIG. 6), empirically determined, randomly determined, or otherwise determined; identifies raw data associated with a predetermined time window and the identified labels; and aggregates the identified raw data into a data pool. The data set builder can optionally segment the data pool into different data sets.

In a second variation, the data set builder can: determine features associated with the detected class, identify raw data having those features, and sample the data set from the identified raw data. However, the data set builder can build the data sets in any suitable manner.

The model building system functions to build new models for a detected class. The model building system is preferably connected to the data ingestion system and a seed model repository, but can be connected to any suitable system. The system can include one or more model building systems or instances (e.g., for different detected classes; a single model building system for all detected classes; for different model providers; for different services; etc.). The model building system can: select the seed model to train; select the training method to use; specify the labels, feature sets, or raw data for training; train the seed models (e.g., using the feature values within the feature sets); or otherwise manage model generation. The model building system can use one or more of: supervised learning (e.g., using logistic regression, using back propagation neural networks, using random forests, decision trees, etc.), unsupervised learning (e.g., using an Apriori algorithm, using K-means clustering, using generative adversarial networks, etc.), semi-supervised learning, reinforcement learning (e.g., using a Q-learning algorithm, using temporal difference learning), backward chaining, forward chaining, and any other suitable learning style (training method).

The seed models function as a basis for trained model generation. The seed model can be an untrained model, a prior version of the model for the given class (e.g., deployed or undeployed; the model with better performance in the last method iteration; the model with worse performance in the last method iteration; etc.; example shown in FIG. 12), or be any suitable model. The seed model is preferably received from model providers (e.g., third party providers, end users, a repository such as Github, publications, etc.) or a seed model database, but can be otherwise determined. The seed models can be: instance-based algorithms, regression analyses, regularization algorithms, classifiers (e.g., two-class classifiers, multi-class classifiers), anomaly detectors, self-correcting learner models, or any suitable model type. Examples of the seed model include one or more of: a rule-based system, a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), a learner model (e.g., eager global learners, lazy learning models, IB3, etc.), and/or any suitable form of machine learning algorithm. Each model can additionally or alternatively include: probabilistic properties, heuristic properties, deterministic properties, and/or any other suitable properties. However, the models can leverage any suitable computation method, machine learning method, and/or combination thereof.

The model building system can optionally version the new models, wherein the new model version can be generated from (e.g., be hashed from): the build time, the seed model identifier, a uniquely assigned identifier, the raw data identifiers, the ingested feature values, the data source identifiers, or any suitable data.

The validation system functions to measure the performance of candidate models (e.g., newly-trained models). The validation system is preferably connected to the model building system and receives new models from the model building system. The validation system can optionally be connected to the data ingestion system, and receive testing data set from the data ingestion system, wherein the testing data set is preferably associated with the new model received from the model building system. In one variation, the validation system generates evaluation metric values for the candidate model based on the testing data set. Examples of evaluation metrics that can be determined include: recall or sensitivity, precision, F1-score, support, confusion matrix, accuracy, specificity, conversion metrics (e.g., conversion rate), validation metrics (e.g., whether predicted subsequent events are detected), speed, latency, cost, or any other suitable evaluation metric.

The deployment system functions to selectively deploy candidate models to the production environment. The deployment system can additionally be connected to the validation system, and can receive the candidate model and the associated evaluation metrics from the validation system. The deployment system preferably deploys candidate models to the production environment when the respective evaluation metric values satisfy a set of deployment conditions (and does not deploy the candidate model when the evaluation metric values fail the deployment conditions), but can otherwise control candidate model deployment to the production environment. The deployment system can optionally determine a deployment time (e.g., to minimize cost, overhead, production environment interruption, etc.), the deployment population(s) (e.g., the geographic regions assigned to the candidate model, the endpoint demographics assigned to the candidate model, etc.), the subscribers for the candidate model (e.g., copy the subscribers for the deployed model for the same class, etc.), or any other suitable deployment parameters.

The production environment functions to analyze real-world data using deployed models. The analysis is preferably run in real- or near-real time (e.g., with raw data receipt), but can be run asynchronously or otherwise performed. The production environment preferably additionally allows endpoints to subscribe to the model analyses (e.g., detected classes, such as detected event classes), and can transmit notifications to the endpoints or perform any suitable action based on the model output(s) (e.g., in response to detection of an event class that the endpoint is subscribed to). The notification can include event data (e.g., event class, start time, end time, duration, geographic location, underlying raw data, subsequently-received raw data associated with the event, etc.) or any other suitable information. The production environment is preferably connected to the same data sources as the testing platform, but can be connected to different data sources. The production environment and testing platform preferably share the data ingestion system(s) or portions thereof, but can alternatively have different data ingestion systems.

In a first variation of operation, the production environment receives raw data from the data sources, extracts the features from the raw data (e.g., using the data ingestion system), labels the raw data (e.g., based on the extracted features), identifies raw data labeled with labels associated with a deployed model, and feeds the features, labels, and/or raw data into the deployed model, which determines whether a detected class is detected.

In a second variation of operation, the production environment receives raw data from the data sources; extracts the features from the raw data (e.g., using the data ingestion system); filters the raw data using a sliding time window, a geofence, or other parameter; and feeds the features for the filtered raw data and/or the filtered raw data itself into the deployed model. However, the production environment can detect the detected classes in any suitable manner based on the raw data.

The deployed models in the production environment can be global (e.g., ingest raw data from a plurality of geographic regions, be applied to a plurality of geographic regions), local to a geographic region (e.g., ingest raw data associated with geographic locations within or otherwise related to the geographic region, be applied to the specific geographic region), or otherwise associated with geographic region(s). A geographic region can be: a unit region (e.g., 1 $m^2$), a geofence (e.g., manually or automatically defined), a geopolitical region, or be any suitable geographic region. Different geographic regions are preferably separate and distinct, but can alternatively overlap.

The evaluation system functions to evaluate the deployed models within the production environment. The results of the evaluation system can be used to determine parameter set generation and selection, data pool generation (e.g., labels for inclusion in the data pool), determine when a replacement model should be generated (e.g., by monitoring concept drift, monitoring accuracy, etc.), or otherwise used. The evaluation system can be: the validation system, a different instance of the validation system, a different system from the validation system, or be otherwise constructed.

The evaluation system can optionally: benchmark new vs. old models for the same class in live performance and/or determine when an old model (e.g., prior model) should be replaced with a candidate model. In one variation, the evaluation system determines evaluation metric values for the new and old models, and replaces the old model with the new model when the new model has better evaluation metric values. The testing data used to determine the evaluation metric values can be: the testing data set used by the validation system, a new data set generated from subsequently-received raw data, or any other suitable data set.

In a second variation, the evaluation system tracks the class detections that are raised by the deployed models, and tracks the detections (e.g., event notifications) that are converted (e.g., used) by an endpoint or end user. The detection conversion can be determined from an endpoint-generated content stream, wherein the detection can be considered converted when: the event is mentioned in the content stream, event-related content (e.g., raw data) appears in the content stream, an event-related action is taken by the end user, when the end user clicks through the notification to the event data, or when any other suitable conversion condition is satisfied. In this variation, the evaluation system can replace the old model with the new model when the new model has a higher conversion rate (e.g., number of used detections over the total number of detections by the respective model), wherein the old model has a preliminary conversion metric value (e.g., preliminary conversion rate) and the new model has a candidate conversion metric value (e.g., candidate conversion rate). For example, the consuming endpoint can be a TV media company that breaks news about fires and other current events. The media endpoint can may use a detection that shows a building on fire, thereby validating that the "building on fire" classification was correct, but not use an image showing a bonfire, thereby invalidating the bonfire's classification as a building on fire. However, the evaluation system can otherwise replace the old model.

In a third variation, the evaluation system tracks the class detections that are raised by the deployed models, and tracks the detections that are validated by subsequent, related detections. In this variation, the class detection can be associated with a series or chain of related class detections, wherein the class detection is validated when the expected preceding or succeeding classes are detected in the preceding or succeeding raw data streams, respectively. In one example, a first event class can be associated with a series of subsequent event classes, wherein the first event class detection can be validated when the series of subsequent event classes are subsequently detected. In one example, a car crash (first event) can be associated with the subsequent events of: increased traffic, a 911 call, a police dispatch, police arrival, and tow truck arrival. However, the evaluation system can determine whether to replace the old model with a new model using a combination of the variants above, or in any suitable manner.

The orchestration system functions to orchestrate, coordinate, and monitor the entire system (e.g., the closed-loop process), and can automatically improve the consuming process based on collected metrics about the performance of the whole system. The orchestration system can schedule different processes of the method (e.g., generate a resource allocation schedule), automatically select processing resources or nodes (e.g., computing hardware) for different processes of the method, automatically instruct the selected resources to execute the assigned processes, or otherwise orchestrate method execution. For example, the orchestration system can send images to GPUs for feature extraction and labeling, and send text to CPUs for feature extraction and labeling. The orchestration system can manage method performance using a directed acyclic graph, cost optimization, or using any other suitable method. The orchestration system can optionally generate rules, performance data, metadata, or other data for the entire process or system.

An alternative embodiment preferably implements the above methods in a computer-readable medium storing computer-readable instructions. The instructions are preferably executed by computer-executable components preferably integrated with an event detection system. The event detection system may include one or more event detectors configured to detect one or more event classes, a data ingestion system, an event detection model building system, a model validation system, and a model deployment system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

4. Method

The method for model management includes, within a testing platform: building candidate model(s) S200, validating the candidate model(s) S300, and selectively deploying the candidate model(s) into a production environment S400. The method can optionally include: receiving raw data from a set of data sources, processing the raw data, and generating data sets from the raw data. The method can optionally include, within a production environment: detecting a class instance based on the raw data using deployed model(s) within the production environment S500, and transmitting a notification to an endpoint associated with the detected class (e.g., a subscriber to the detected class) S600.

The method functions to automatically generate (e.g., train), test, and deploy new models into the production environment. In variants, this can be performed while events are being detected in real- or near-real time by previously deployed models within the production environment (e.g., in parallel with production environment execution). In these variants, the testing platform and the production environment preferably ingest the same raw data, such that the candidate models are generated using the same data (or a subset thereof) as that used by the deployed models to detect class instances. However, the candidate models can be generated using different data.

The method can also automatically generate data sets (e.g., testing data sets, training data sets), evaluate new model performance, coordinate sub-system operation (e.g., to optimize overall system performance and/or resource consumption), or perform any suitable process.

The method is preferably executed by the system disclosed above, but can alternatively be executed by any suitable system. The method is preferably executed automatically when a run condition is met, but can alternatively or additionally be executed in response to a user input (e.g., a run command), or be executed at any suitable time. Satisfaction of the run condition is preferably determined by the evaluation system, but can alternatively be determined by any suitable subsystem. The run condition is preferably automatically determined, but can alternatively be manually determined or otherwise determined. The run condition is preferably monitored by the orchestration system, but can be performed by any other suitable system.

In a first variation, the run condition is met when one or more evaluation metric values for a deployed model surpasses a predetermined threshold. For example, the run condition can be met when the deployed model performance (e.g., accuracy or precision) falls below a predetermined threshold, when the deployed model has a concept drift parameter that is above or below a threshold value, or when the deployed model outputs false positives or false negatives at a rate exceeding a predetermined threshold.

In a second variation, the run condition is met when the cost of executing the method is lower than a threshold value. The threshold value can be a static value (e.g., set by a system manager), an estimated return (e.g., determined from the evaluation metric values for the currently deployed model for the same detection class; determined from the conversion rate for the currently deployed model, etc.), or otherwise determined. The cost of executing the method can be determined based on: computing resources required to train the model (e.g., known, estimated); training time (e.g., known, estimated); computing resource cost (e.g., current computing node cost, anticipated computing node cost, opportunity cost to using a resource to train a first model versus a second model, etc.); or otherwise determined.

In a third variation, the run condition is met when sufficient data has been received from the data sources after a cutoff time. The cutoff time can be the time of last model build for the class, the last timestamp of the data included in the data pool used in a prior model build (e.g., last model build, last model built that satisfied deployment criteria, etc.), be an arbitrary cutoff time, be a sliding window (e.g., measured backward and/or forward from the current time or from a concept drift timestamp), or be any other suitable cutoff time.

Different criteria can be used to determine whether sufficient data has been received for different models (e.g., seed models) or detection classes. Sufficient data can be: a threshold number of pieces of data, a threshold number of pieces of data satisfying data pool inclusion conditions, or otherwise defined. However, different models and/or classes can have the same criteria to determine whether sufficient data has been received. The threshold number of pieces of data can be: predetermined, determined based on the class (e.g., event class), determined based on the model type, determined based on the raw data domain(s), or otherwise determined. In one variation, the threshold number of pieces of data can be scaled (e.g., proportionally, directly) as a function of event frequency. The event frequency can be empirically determined, estimated, manually set, or otherwise determined. In a second variation, the threshold number of pieces of data can be specified by the seed model. However, the threshold number of pieces of data or other criteria can be otherwise determined.

In a fourth variation, the run condition is met when the data pool inclusion conditions are met. In a fifth variation, the run condition is met when the evaluation system transmits a notification to the testing environment, indicating that a new model should be generated for a given detection class. In a sixth variation, the run condition is met when the anticipated candidate model improvement over the prior model exceeds a predetermined threshold (e.g., 10%, 50%, 70%, 90% improvement, etc.). The anticipated improvement can be determined based on: the anticipated evaluation metrics for each model, whether sufficient data has been received, or otherwise determined. In a specific example, the run condition is met when the benefit to running the method (e.g., based on increased detection accuracy, revenue per accurate detection, etc.) exceeds the cost of executing the method (e.g., beyond a predetermined return threshold, such as 0% return, 10% return, 50% return, 70% return, 90% return, etc.). However, the run condition can be met based on a combination of the above or met in any other suitable manner (e.g., at a predetermined frequency).

Method execution can optionally automatically stop or pause. The method preferably automatically stops when a set of stop criteria are met, but can alternatively or additionally stop running upon receipt of a user input (e.g., a cessation command), or stop at any suitable time. Examples of the stop criteria can include: when a maximum number of candidate models have been generated (e.g., overall, for the detected class, etc.), when a threshold number of tests have been performed, when a maximum number of untested candidate models have been generated, when a resource timeout occurs (e.g., wherein a model with the best score, determined from the respective evaluation metric values, can be selected for deployment; wherein the deployed model is maintained and not replaced; etc.), when an execution cost exceeds a threshold, when a set of evaluation metrics are satisfied (e.g., when the model accuracy exceeds a threshold), or be any other suitable stop event.

One or more instances of the method can be executed in parallel, in series, or at overlapping times. For example multiple model instances can be generated for: the same detection class, multiple detection classes, multiple geographic regions, a single geographic region, a demographic, a domain, or for any suitable variable. Method execution for different instances or classes can be prioritized based on (e.g., correlated with or as a function of): the associated concept drift parameters, prior model inaccuracy (e.g., inaccuracy of the deployed model for the same detected class), class frequency (e.g., how frequently an event class occurs), or based on any other suitable variable.

The model(s) (e.g., candidate and/or deployed) function to detect instances of one or more detection classes within the raw data stream. The models are preferably binary classifiers, but can alternatively be multi-label classifiers. The models preferably ingest feature values from the raw data, but can additionally or alternatively ingest the raw data itself, the labels for the raw data, or any other suitable variable value.

Figure 4:
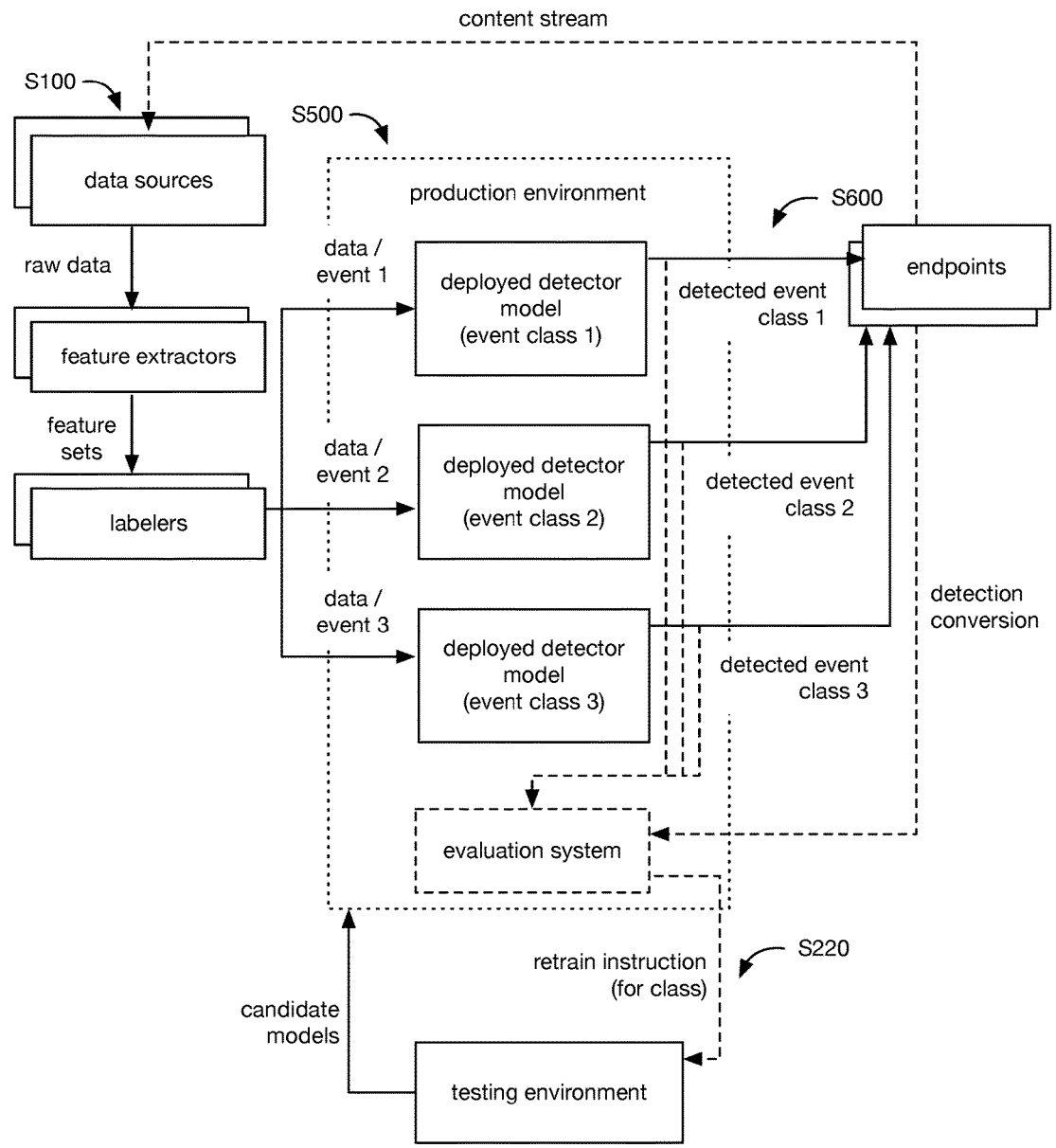
FIG. 4 is an example of class instance detection (e.g., event detection) using different models for each class.
Figure 5:
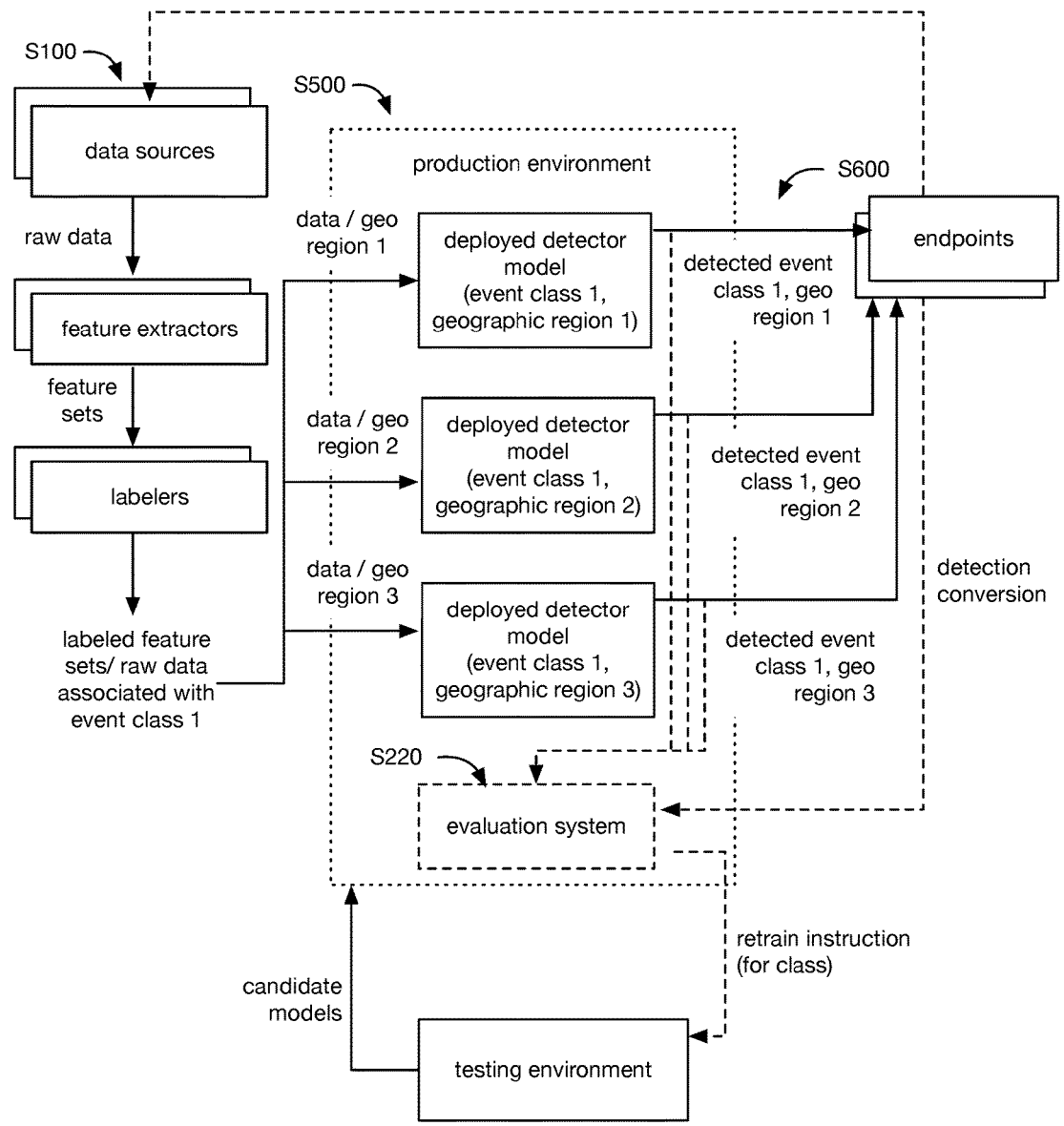
FIG. 5 is an example of class instance detection (e.g., event detection) using different models for each geographic region.

The method can use and/or generate one or more models for each: detection class (e.g., event class, example shown in FIG. 4), geographic region (e.g., example shown in FIG. 5), demographic (e.g., group of users sharing a common characteristic), time period, or other parameter segmentation. For example, each model can detect a type or class of event, multiple related types of events, multiple unrelated event types, or any set of events (e.g., all events). However, the method can alternatively use and/or generate a single global model or any suitable number of models. When the method utilizes a different model for a different parameter segment, the model is preferably optimized for the given parameter segment. However, the model can be otherwise constructed.

The models preferably each ingest raw data from multiple modalities or domains (e.g., include two or more data types), but can alternatively ingest raw data from a single modality. The model can be specific to a single domain (e.g., image recognition, NLP), span multiple domains, span all domains, or span any set of domains. Examples of domains include: image recognition, translation, and speech recognition. Examples of modalities include: natural language (e.g., text, spoken, written), visual (e.g., image, video), haptic, kinematic, auditory (e.g., voice, sound, music), smell, taste, egomotion, or physiological signals.

The resultant models are preferably detection models, more preferably event detection models, but can alternatively or additionally include: inference models, prediction models (e.g., customer response models, trading models, etc.), classification models, labeling models, or any other suitable model. The models can include one of more of the model types discussed above for the seed model. The models can be a single model or be made of multiple sub-models chained together in series, in parallel, or a combination of the thereof. The models are preferably a set of algorithms with predetermined algorithmic parameters (e.g., tuned based on the training data) and/or node relationships, but can be otherwise structured.

In one example, the model detects the occurrence of an associated event class (or sub-class) when the combination of raw data features (e.g., feature combination) for a given geographic region has a probability (e.g., feature combination probability) below a threshold probability. In this example, the model can ingest the feature combination, determine the feature combination probability (e.g., via calculation, selection, etc.), and determine whether the feature combination probability falls below the threshold probability. The threshold probability (e.g., for that event class, for the geographic region, global) can be determined empirically, manually, by one or more models, or otherwise determined.

In a second example, the model detects the occurrence of an associated event class (or sub-class) when a feature's occurrence rate (e.g., frequency) within a geographic region deviates from a historic frequency beyond a threshold deviation. In a third example, the model detects events using the methods disclosed in U.S. application Ser. No. 15/902,935. However, the event can be otherwise detected.

The model (or other model) can additionally or alternatively predict or be associated with secondary events (e.g., predicts secondary event class detection). The secondary events are preferably predicted based on a detected event (e.g., using the methods discussed above), but can alternatively or additionally be detected directly from the raw data. The secondary events can be past events (e.g., preceding events), future events (e.g., succeeding events), or related concurrent events (e.g., a sister event that occurs at the same time as the detected event). The secondary event can be predicted based on a predetermined chain of events, predicted by a prediction model (e.g., ingesting all or a portion of the raw data ingested by the model), or otherwise determined. This can be useful when the detected event is part of a series of related events, wherein the detected event can be an initial event, an intervening event, or a terminal event within the event chain.

The secondary events are preferably associated with a secondary event class and an occurrence time window (e.g., defined from detected event's event time), wherein the secondary event is expected to occur within the occurrence time window. The secondary events can additionally be associated with a secondary geographic region, wherein the secondary geographic region can be the geographic region of the detected event, a geographic region having a predetermined set of parameters related to the detected event's geographic region (e.g., an adjacent region), or any other suitable region. Actual detection of the expected secondary event in the raw data (or absence thereof) can be used to validate the model and/or to determine evaluation metrics for the model. The secondary events associated with the detected event (and/or order of events) can be determined: manually; from a historic pattern of event classes (e.g., recurrent; for the geographic region; etc.); from calculated correlations; from known causations; or otherwise determined. In one example, a car crash event can be associated with the subsequent events of: an emergency services call, an emergency response, and increased traffic, wherein one or more of the subsequent events are expected to be detected in the real-time raw data (e.g., data generated within a predetermined time window of a current time) that are associated with the car crash location (e.g., geotagged with, mentioning the location) within a predetermined time window (e.g., 4 hours). However, the secondary events can be otherwise determined.

Building candidate models S200 functions to generate candidate models that may perform the tasks (e.g., detecting events) better than prior models. S200 is preferably executed by the model building system, but can be executed by any suitable system.

Figure 3:
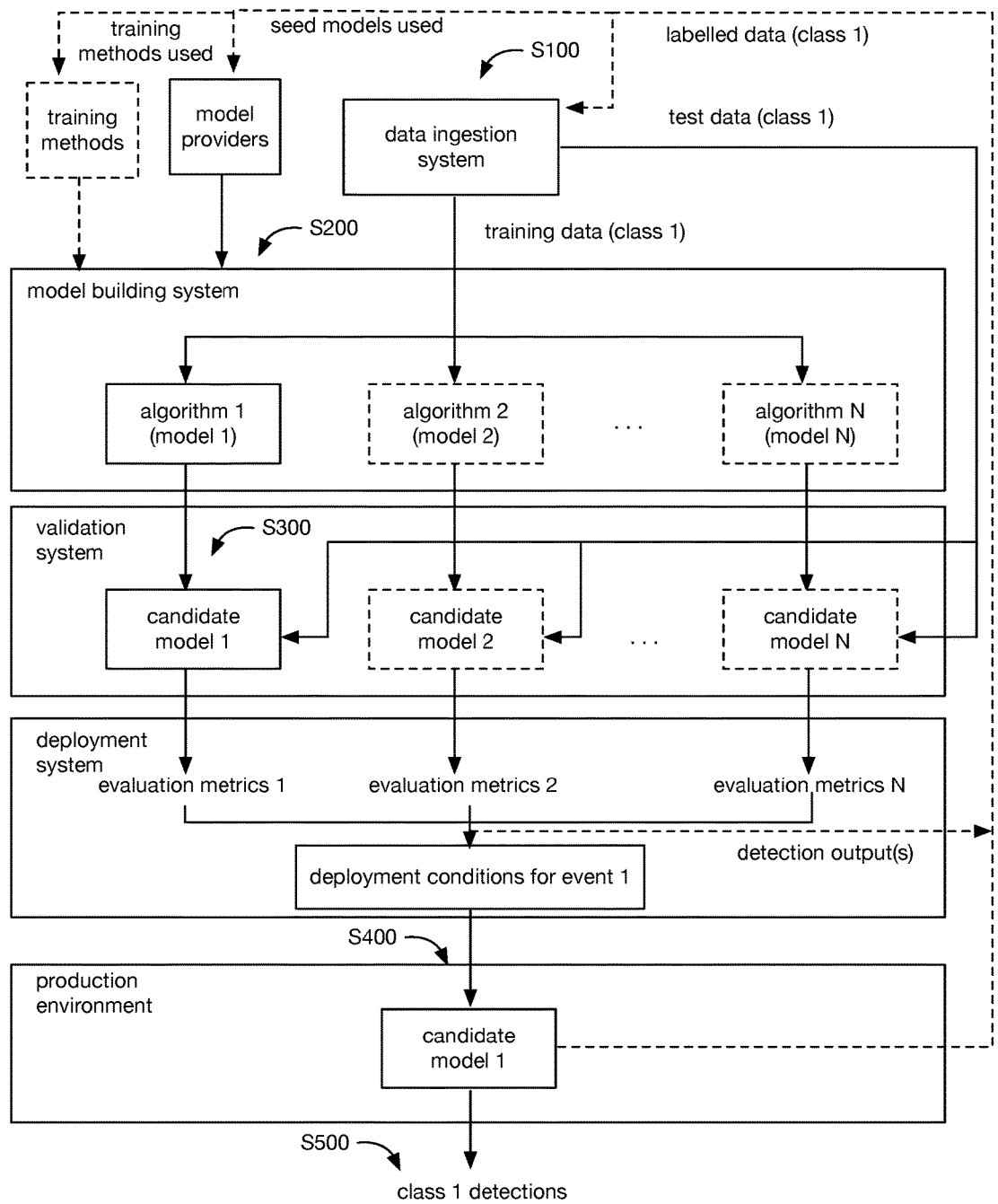
FIG. 3 is an example of the method.

S200 can concurrently build one or more candidate models for a given class, wherein the multiple candidate models can use different seed models and/or be trained on different training data sets (example shown in FIG. 3). Alternatively, different candidate models can be serially built for a class. S200 can concurrently build candidate models for one or more classes, or serially build the candidate models for different classes.

S200 is preferably performed when an execution condition (e.g., build condition) is met (e.g., in response to determining execution condition satisfaction S220), but can be performed at any suitable time. The execution condition can be the run condition, a condition similar to the run conditions specified above, at a predetermined frequency, the receipt of a user input (e.g., a "build" command), constantly, when the computing resources satisfy a resource condition (e.g., when enough computing resources are available or anticipated to be available; when the computing costs drop below a threshold amount; etc.), or be any suitable condition.

Figure 9:
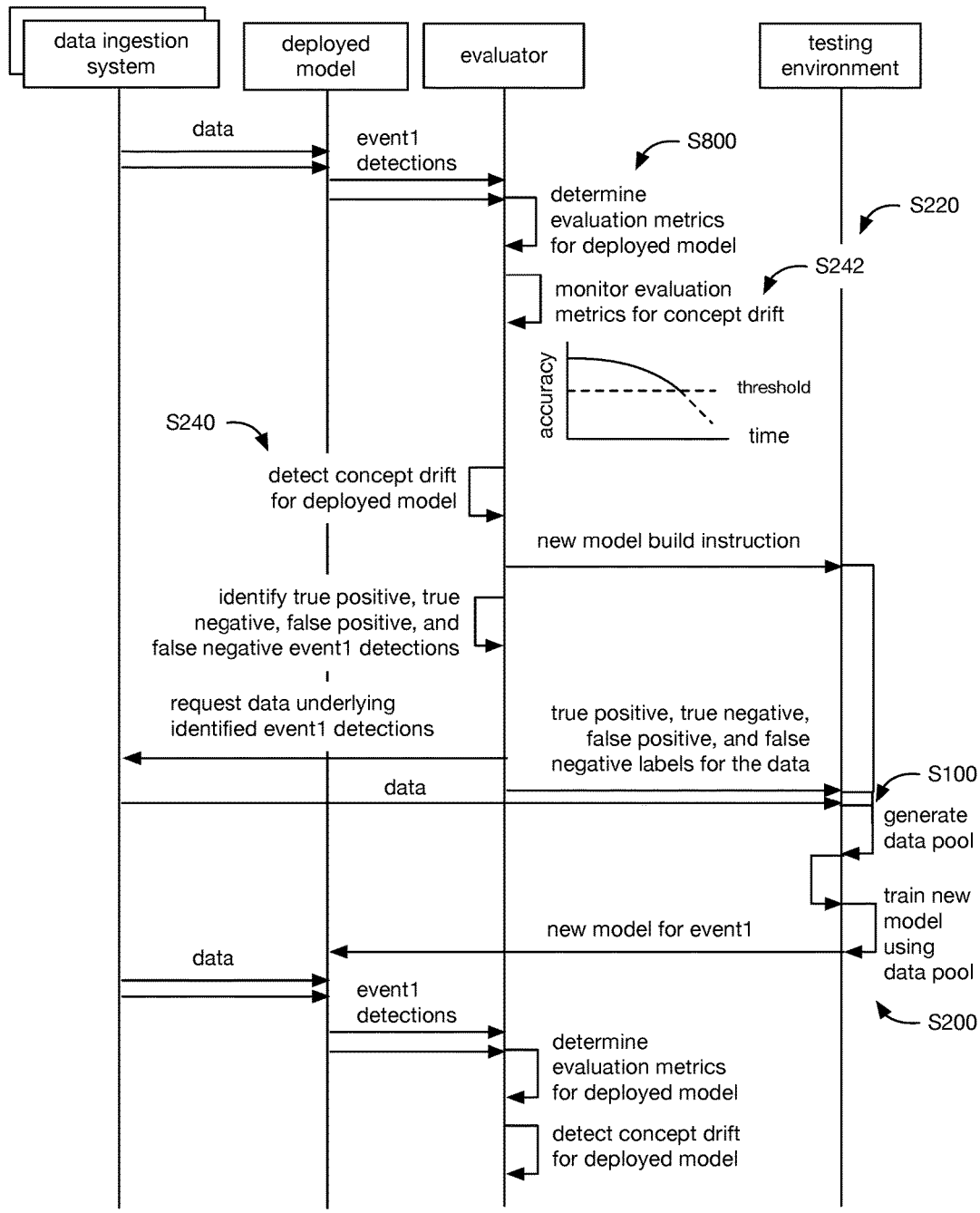
FIG. 9 is an example of determining execution condition satisfaction in response to concept drift detection for an event class.

In one variation, the execution condition is met S220 when a concept drift parameter value exceeds a threshold parameter value S240 (example shown in FIG. 9). Concept drift can be an underlying distribution (e.g., semantic distribution, feature distribution, etc.) that generates response variable changes over time, and can be due to evolving data that changes in statistical distribution or bias based on uncontrolled external real-world influences, or be otherwise defined. The concept drift parameter can be: whether a concept drift exists (e.g., be a binary value), the concept drift amount, the concept drift rate, the concept drift acceleration, the concept drift direction (e.g., toward another concept or class, away from another concept or class), or be any other suitable parameter. The concept drift parameter value is preferably determined from a benchmark time point (e.g., a timestamp associated with the prior deployed model), but can be otherwise determined.

The concept drift parameter is preferably determined for a given detection class, and can additionally or alternatively be determined for a geographic region, a demographic, a domain, or any other suitable variable. The concept drift parameter value can be determined: manually, automatically, or otherwise determined.

In this variation, the method can optionally include monitoring concept drift S242. S242 can include: determining a concept drift parameter value for detection classes (e.g., classes detected by the deployed models), determining the performance of the deployed models (e.g., wherein the model performance on up-to-date data can function as a proxy for concept drift), determining a concept drift parameter value for the deployed model for a given detection class, or otherwise monitor for concept drift.

The concept drift parameter value can be determined from: raw data (e.g., generated within a predetermined time window), the results of a prior model (e.g., the deployed model), or otherwise determined. The predetermined time window can be determined based on: an anticipated concept drift rate for the class (e.g., shorter for higher drift rates), a receipt frequency for the raw data used in class detection (e.g., longer for lower frequency data), an anticipated class occurrence frequency (e.g., longer for lower frequency data), or otherwise determined.

The threshold parameter value can be manually determined, automatically determined, or otherwise determined. The same or different threshold parameter values can be used for different classes or population segmentations (e.g., geographic regions, demographics, etc.). In one variation, the threshold parameter value varies as a function of class occurrence frequency. In an example, that higher-frequency classes have higher concept drift requirements before requiring retraining. In a second variation, the threshold parameter value varies based on computing resource availability (e.g., higher thresholds during high-load periods). In a third variation, the threshold parameter value varies as a function of detection result severity. For example, a nuclear-bomb event detector can have a lower threshold (e.g., be trained more readily) than a car-crash event detector. In a third variation, the threshold parameter value is determined based on parameter values of the underlying raw data, such as the occurrence frequency of the underlying raw data, accuracy of the respective data source, or other raw data parameters. However, the threshold values can be otherwise determined.

In one variation, the concept drift parameter value is determined using a concept drift detection system, trained on training data sets exhibiting known concept drifts over time (e.g., for the specific detection class, for any detection class, etc.).

In a second variation, the concept drift parameter value is determined based on the evaluation metrics for the deployed model. In an embodiment of the second variation, concept drift is detected when the deployed model's inaccuracy rate has exceeded a predetermined threshold. In a second embodiment, concept drift is detected when the deployed model's inaccuracy rate has exceeded a predetermined threshold. In a third embodiment, concept drift is detected upon identification of a change point, using a sum of the overall classification error and the empirical standard deviation. In a fourth embodiment, concept drift is detected when the sum of false positive and false negatives change (e.g., using a drift detection method). In a fifth embodiment, concept drift is determined using: DDM-online class imbalance (DDM-OCI), early drift detection method (EDDM) (measure distance between classification errors), linear four rates (LFR), or using any other suitable concept drift determination method. In a fifth embodiment, the concept drift parameter values can be determined based on the concept drift detected and/or calculated over a predetermined period of time.

In a third variation, the concept drift parameter value can be received from a database (e.g., a third party source tracking concept drift for the population segment). However, the concept drift parameter value can be otherwise determined.

In a second variation, the execution condition is met S220 when the evaluation metric values, or combination thereof (e.g., according to a weighted equation), falls below a predetermined value or score. The predetermined value or score preferably varies based on the detection class, but can vary as a function of time, geographic region (e.g., associated with the raw data), or otherwise vary. The predetermined value or score can be manually determined, automatically determined (e.g., based on class characteristics), or otherwise determined.

Building the model S200 preferably includes training seed models with data from a training data set (generated as discussed below), which functions to generate the candidate models by training the seed models to algorithmically output the label (e.g., event class labels) associated with each piece of training data within the training data set.

Training seed models can optionally include selecting a seed model to train. The seed model can be selected based on one or more of: the detection class, the labels associated with the class (e.g., number of labels, label values, etc.), the features associated with the class, the domains or modalities associated with the class, the geographic region associated with the class, the demographics associated with the class, the training time associated with the seed model, the amount of available training data, the results of prior method iterations, or otherwise selected. In one example, selecting the seed model can include selecting a seed model associated with the higher-performing model (e.g., highest-performing model) in a historic model iteration (e.g., the last model iteration, the last 3 model iterations, etc.), specific example shown in FIG. 12. In this example, the seed model can be: the seed model that was trained to generate the higher-performing model, a seed model from the same class of models as the higher-performing model, or any other suitable seed model. In a second example, selecting the seed model can include selecting the seed model having historically consistent metric values (e.g., above a threshold metric value). However, the seed model can be randomly selected, specified by a user (e.g., a model provider, a subscriber), be the same type as a prior model for the class, be the prior model itself, or be any other suitable model.

Training the seed model can optionally include selecting a training method (learning style, learning algorithm) to train the seed model. The training method can be selected based on one or more of: the detection class, the labels associated with the class (e.g., number of labels, label values, etc.), the features associated with the class, the domains or modalities associated with the class, the geographic region associated with the class, the demographics associated with the class, the training time associated with the seed model, the amount of available training data, the results of prior method iterations (example shown in FIG. 12), or otherwise selected. The training method can be pre-associated with the aforementioned factors (e.g., detection class, labels, etc.), be dynamically associated, be selected based on the results of S300 or S400 (e.g., shown in FIG. 12), or otherwise determined. In one example, selecting the training method can include selecting a training method associated with the higher-performing model (e.g., highest-performing model) in a historic model iteration (e.g., the last model iteration, the last 3 model iterations, etc.). In this example, the training method can be: the training method that was used to train the higher-performing model, a training method from the same class of training methods as that used to train the higher-performing model, or any other suitable training method. However, the training method can be randomly selected, specified by a user (e.g., a model provider, a subscriber), be the same type as a prior training method for the class, be the prior training method itself, or be any other suitable training method.

The method can optionally include preparing data S100, which functions to clean, label, annotate, or otherwise process the raw data into formats compatible with the models. Preparing data can optionally function to generate data sets. The data is preferably prepared by the data ingestion system, but can be prepared by any other suitable system. The data is preferably continuously prepared (e.g., in real or near-real time, as the data is being received), but can alternatively be prepared in batches, be prepared upon satisfaction of a preparation condition (e.g., the preparation cost falling below a threshold value, receiving a threshold number of raw data, etc.), or prepared at any suitable time. Data can be prepared (and/or received or processed) on a per class basis, per model basis, per source basis, per domain or modality basis, prepared as a population (e.g., agnostic to population segmentation), or otherwise prepared.

Preparing data can include: receiving raw data from a set of data sources, processing the raw data, and/or generating data sets. However, the data can be otherwise processed.

Receiving raw data from a set of data sources functions to collect data for class detection (e.g., by the deployed models) and/or for new model generation. Raw data is preferably continuously received, but can alternatively be received in batches (e.g., when retrieved from the data source) or otherwise received. The data used for class detection and new model generation are preferably pulled from the same raw data set, but can alternatively be pulled from different data sets. In one variation, the data used for new model generation is a subset of the data used for class detection. However, the data can be otherwise shared between new model generation and class detection.

The data sources (data providers) function to provide raw data to the system. The data sources are preferably constantly connected to the system, but can additionally or alternatively be intermittently connected to the system. The data sources preferably push raw data to the system (e.g., wherein the data sources automatically send raw data to the system), but can alternatively require that data be requested from the data source (e.g., be pulled from the system). The data providers can include: static sources (e.g., historic databases, maps, etc.), dynamic sources (e.g., sources that generate a time-variant content stream, etc.), or any other suitable data source. Examples of data sources include: social networking systems, emergency systems, routing systems, distributed sensor networks such as traffic cameras or traffic lights, or any other suitable data source.

The raw data functions as the basis for model analyses (e.g., event detection in the production environment), and can optionally function as training or testing data for new models. The raw data is preferably data received from the data source, but can alternatively be processed data or any other suitable data.

The raw data preferably spans multiple modalities, but can alternatively be from a single modality. Examples of raw data include: text, image, video, audio, kinematic data, sensor data (e.g., from static sensors, mobile sensors, etc.), temperature data, still frame, time series, emergency calls, navigation data, behavioral data, transactions, historic records, or any other suitable data. The raw data can be unlabeled, be associated with metadata (e.g., generation timestamp, geotagged, etc.), or otherwise annotated.

The raw data is preferably real-world data, but can alternatively include synthetic data or any other suitable data. Real world data is preferably data generated from on real-world signals (e.g., data obtained by direct measurement of the real world). Examples of real-world data include: images or video sampled by physical optical sensors, audio sampled by physical microphones, kinematic signals sampled by physical kinematic sensors (e.g., accelerometers, IMUs), content generated by authors (e.g., human authors, automated authors, etc.), or any other suitable data.

Synthetic data is preferably artificially generated data, which can be generated from real-world data, a set of synthesis parameters (e.g., which objects should be in the scene, pose, sentiment, etc.), and/or any other suitable data. The synthetic data can be manually generated, generated using generative models (e.g., generative adversarial networks (GAN)), or otherwise generated. However, any other suitable raw data can be used.

Figure 10:
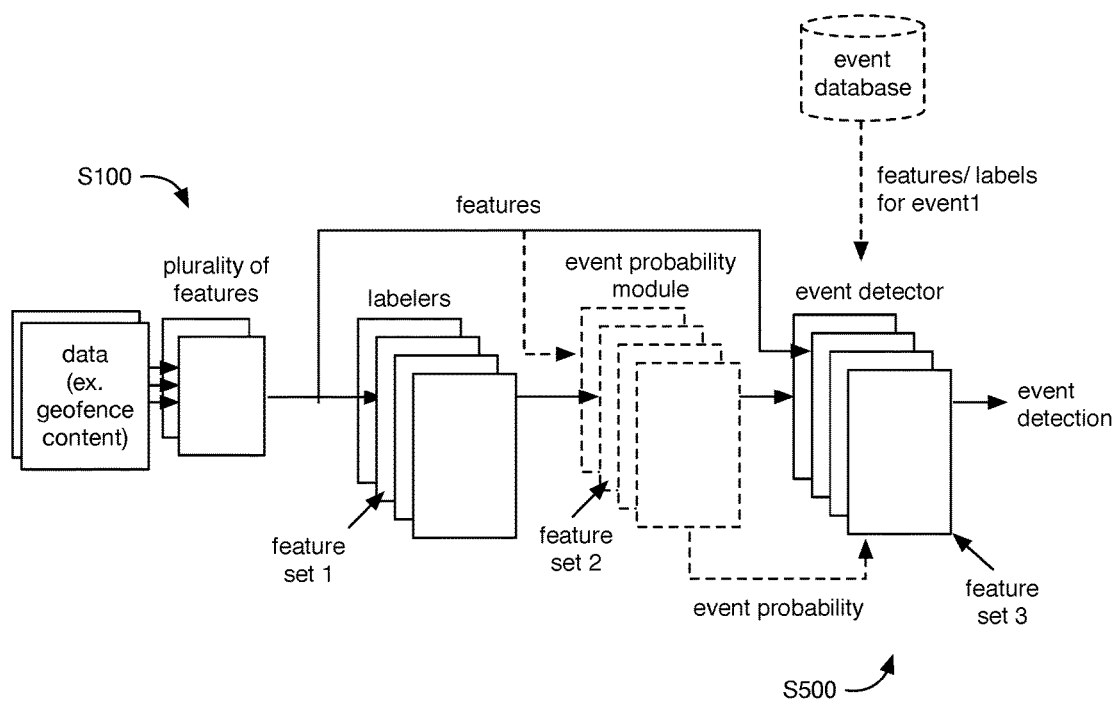
FIG. 10 is an example of data preparation and ingestion by a deployed model.
Figure 11:
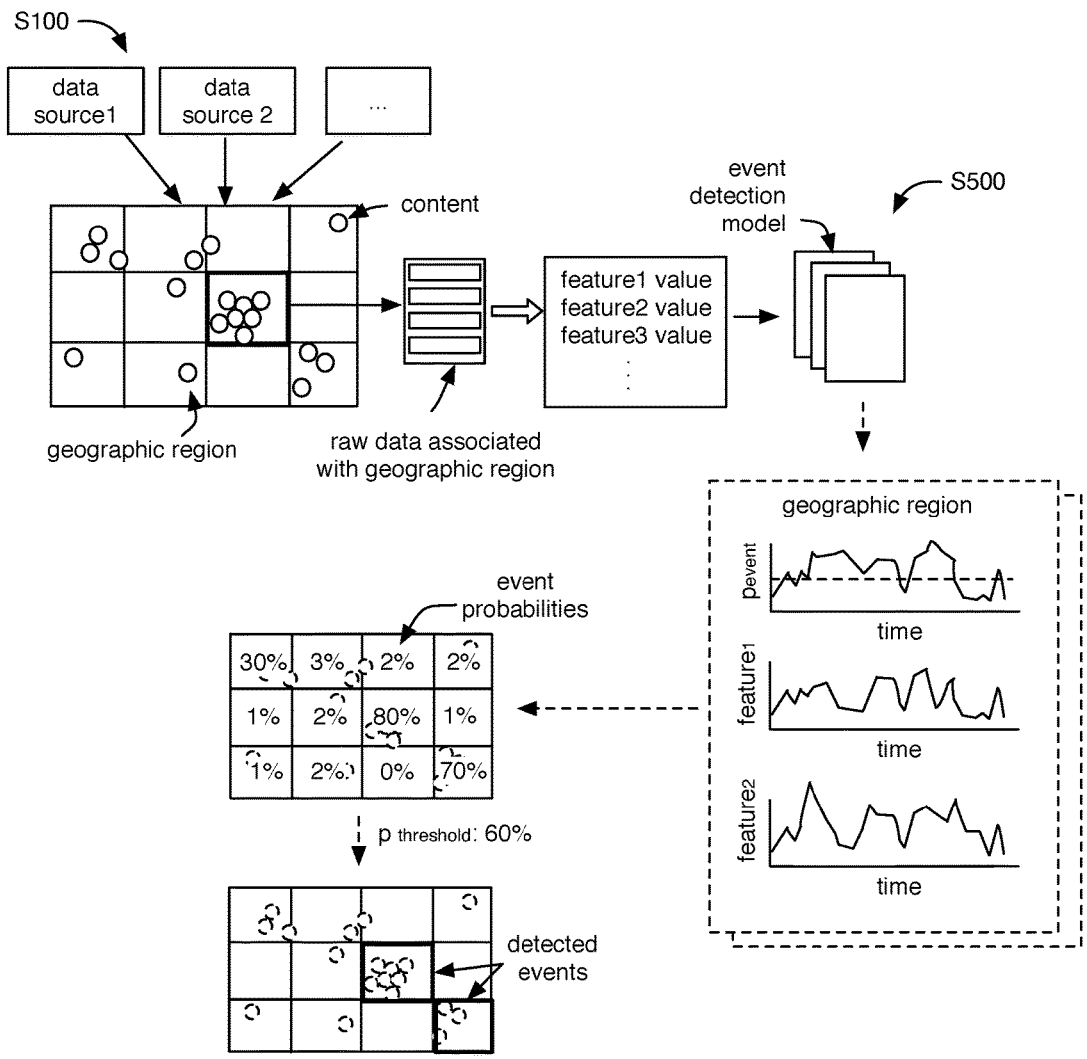
FIG. 11 is an example of detecting an event within a geographic region.

Processing the raw data functions to generate data formats that are compatible with the models (e.g., structured data; arrays of feature values) and/or machine learning algorithms. The raw data is preferably continuously processed (e.g., as the raw data is received), but can alternatively be batch processed (e.g., for a specific model, for a specific modality, for a specific data source, etc.), or processed at any suitable time. Processing the raw data can include: extracting features from the raw data; determining labels for the raw data (example shown in FIG. 10); or otherwise processing the raw data.

Extracting features from the raw data functions to reduce the dimensionality of the raw data. The features (examples as discussed above) are preferably extracted using feature extractors, which can be specific to the raw data's modality, the data source, be global feature extractors, or be any other suitable feature extractor.

Determining labels for the raw data functions to generate higher-level context of the raw data. The labeled raw data and/or labeled feature sets can be subsequently used to generate data sets, fed into deployed model for class detection, or otherwise used. The raw data is preferably labeled continuously (e.g., immediately after the feature sets are extracted), but can alternatively or additionally be labeled in batches, periodically, or at any suitable time. The raw data is preferably labeled using a labeler, but can be otherwise labeled. The raw data is preferably labeled based on the respective features (e.g., extracted from the raw data), but can alternatively or additionally be labeled based on: other labels associated with the raw data, labels associated with the respective data source, labels associated with related pieces of raw data (e.g., temporally related, such as temporally adjacent; geographically related, such as geotagged with the same geographic location or region; etc.), other detected events (e.g., associated with the same timeframe, the same geographic region, etc.), or based on any other suitable information.

Generating data sets from the raw data functions to create data sets that can be used for training, testing, or other uses. The data sets are preferably generated in response to satisfaction of the execution condition, but can alternatively be generated continuously, in batches, or at any suitable time.

The data sets are preferably generated by one or more data set builders, but can be otherwise generated. The data sets are preferably specific to a given candidate model for a given event class, but can alternatively be shared across different candidate models for a given event class, different candidate models for a different event classes, or otherwise built and used.

Generating data sets can include: determining a data pool, which functions to determine a subset of data from a source pool for use in model generation. In a first variation, the data pool is used as the training data set or testing data set. In a second variation, the training data set and testing data sets are generated from the data pool. In a third variation, the data pool is the raw data pool.

The source pool can include: data currently being received from the data sources, historic data (e.g., previously received from the data sources; raw or processed; data used in prior method iterations; data underlying past detections; etc.), synthetic data, or any other suitable data. The historic data can be data within a sliding time window, all historic data, or any other suitable historic data. Data within the source pool can include one or more of: raw data, feature sets from the raw data, labels, summary data, derivative data (e.g., averages, summations, results of weighted calculations, etc.), other reduced-dimensional representations of the raw data, or any other suitable data.

Figure 7:
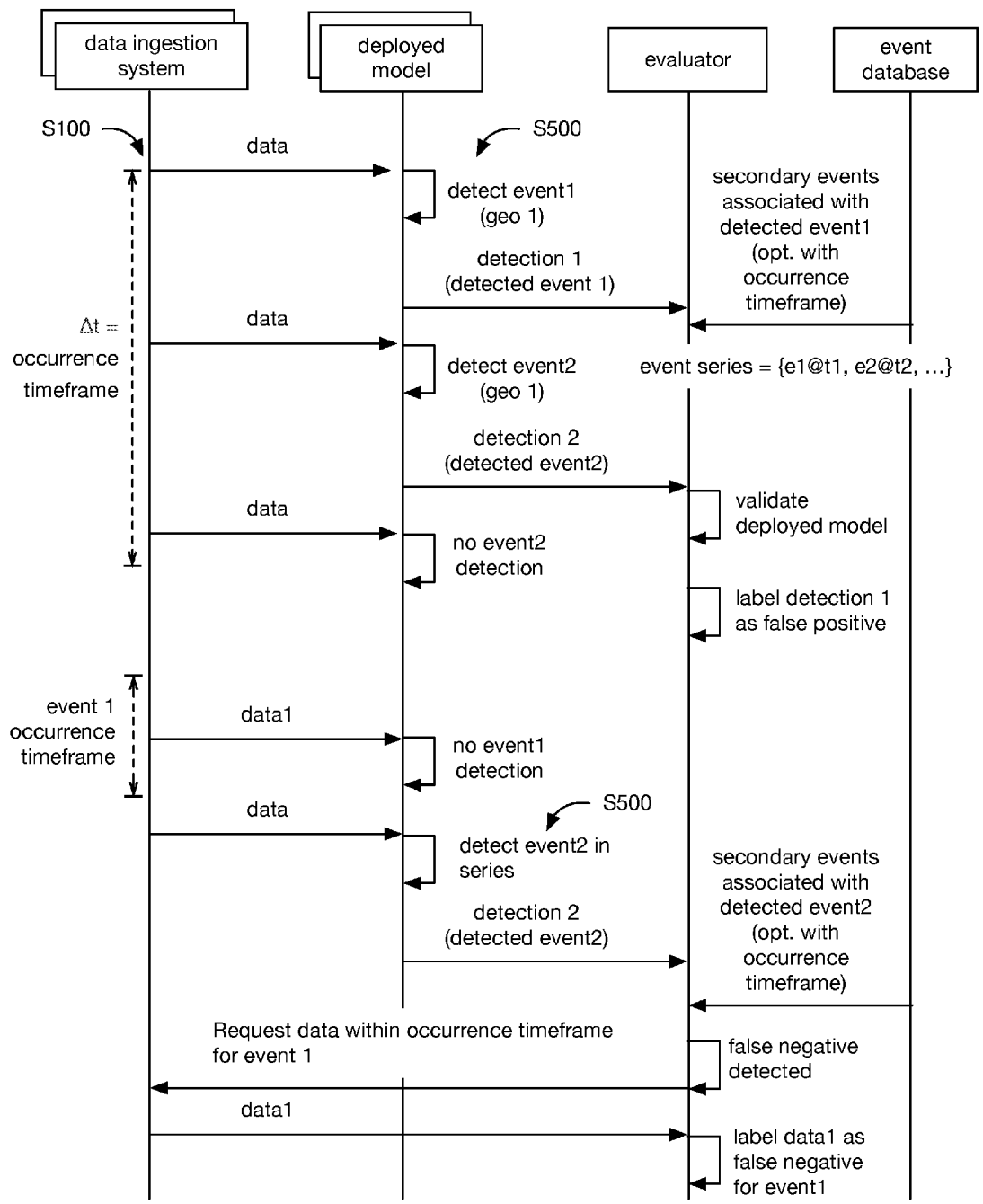
FIG. 7 depicts an example of identifying a false positive detection and an example of identifying a false negative detection based on event series.
Figure 8:
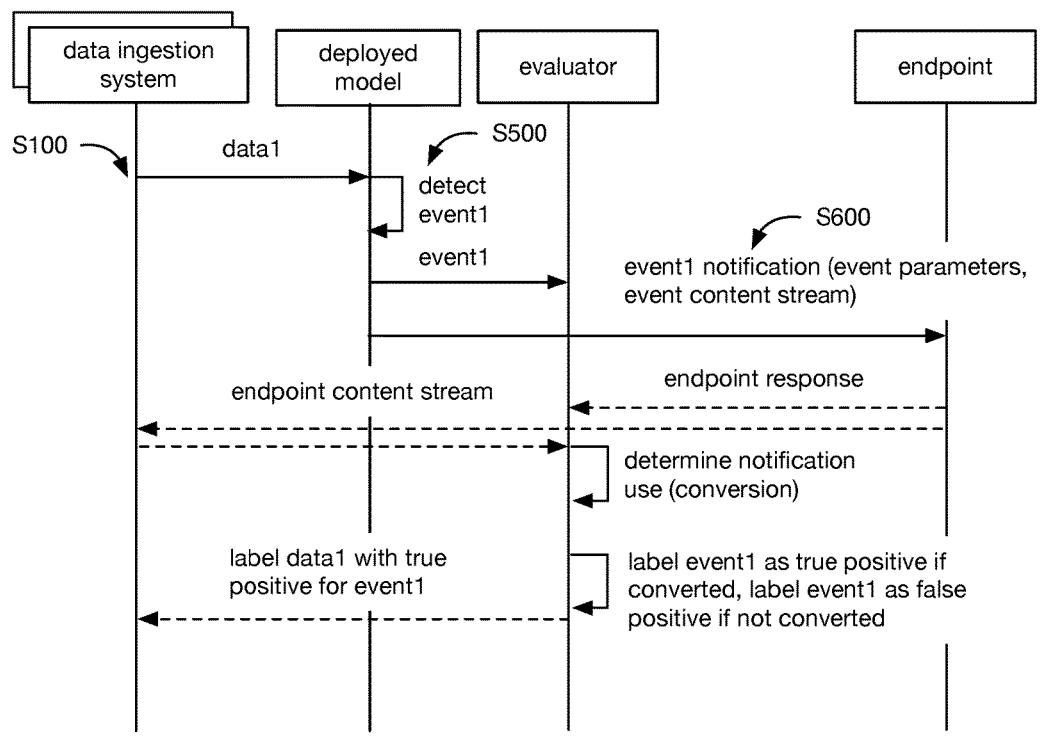
FIG. 8 is an example of determining event detection conversion by an endpoint.
Figure 13:
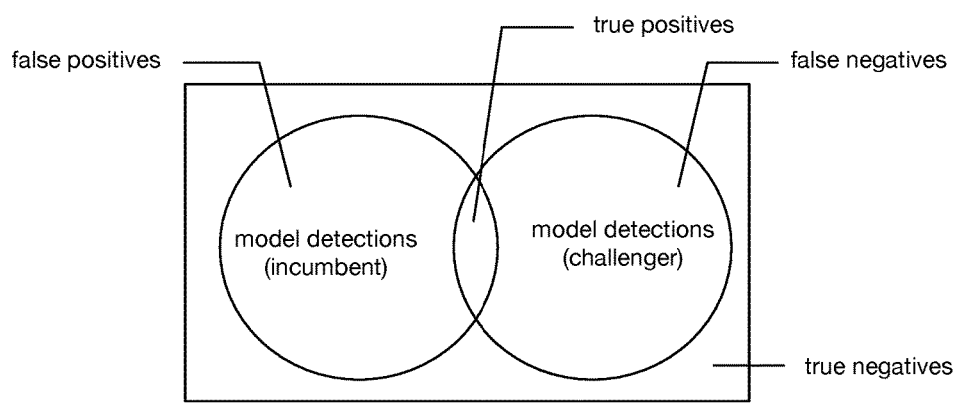
FIG. 13 is an example of determining data labels based on a comparison between the detections output by the incumbent model and the challenger model.

The data pool can be specific to one or more of: a detection class, a time frame, a domain, a modality, a geographic location, seed model type, learning type (e.g., transductive learning, inductive learning), a candidate model, or any other suitable population segment. However, the data pool can be globally applied or otherwise applied. The data within the data pool can include: raw data, derivative data (e.g., feature sets, summary data, etc.), or any other suitable data. The data pool preferably includes data from multiple modalities or domains (e.g., wherein the modalities or domains can be associated with the event class), but can include data from a single modality or include any suitable data. The data within the data pool is preferably labeled as true or false for the class (e.g., for the event class), but can be otherwise labeled. The true or false labels can be determined: manually, by a past model (e.g., based on past detections by a deployed model and/or incumbent model), by a second model (e.g., with higher accuracy than the deployed model), by an end user (e.g., upon conversion, example shown in FIG. 8), based on whether predicted class instances are detected (example shown in FIG. 7), based on a comparison between the detections that are output by the incumbent model and the challenger model (e.g., output differences, discussed below; example shown in FIG. 13), or otherwise determined.

The data pool is preferably balanced (e.g., includes the same number of true and false samples), but can alternatively be unbalanced (e.g., include more true or false samples). The data pool preferably includes a minimum number of data pieces (e.g., 500, 1000, determined based on the seed model type, event rarity, or data rarity, etc.), but can include any suitable number of data pieces. The data pool preferably includes data from known distractor classes or labels, but can alternatively not include distractor data. The data pool preferably includes new data, particularly data associated with detected concept drift (e.g., data received after concept drift detection, data used to detect the concept drift, etc.), but can alternatively or additionally include historic data or any other suitable data.

In a first variation, the data pool (and/or source pool) can include data associated with a predetermined time period. In one embodiment, the data within the data pool can be limited to data generated after a cutoff time (e.g., which can be similar to or different from the cutoff times used to determine whether a run condition has been met).

In a second variation, the data pool can include a prior data pool used to train a prior model (e.g., the incumbent model and/or a prior challenger model).

In a third variation, the data pool can include data associated with a geographic region. The geographic region can be associated with the class (e.g., based on a historical physical extent of the event), with the candidate model, or otherwise determined.

In a fourth variation, the data pool can include data with labels associated with the class (e.g., with the event class). The label-class association is preferably predetermined (e.g., known a priori) based on the labels for data ingested by prior models for the same class, but can be dynamically determined, randomly assigned, iteratively determined, empirically determined, manually specified, or otherwise determined. In a specific example, the labels of fire, smoke, emergency response, and emergency call can be associated with the event class of car crash. Alternatively or additionally, the data pool can include data with labels unassociated with the class, wherein the unassociated labels can be randomly selected, iteratively determined, or otherwise determined.

Figure 12:
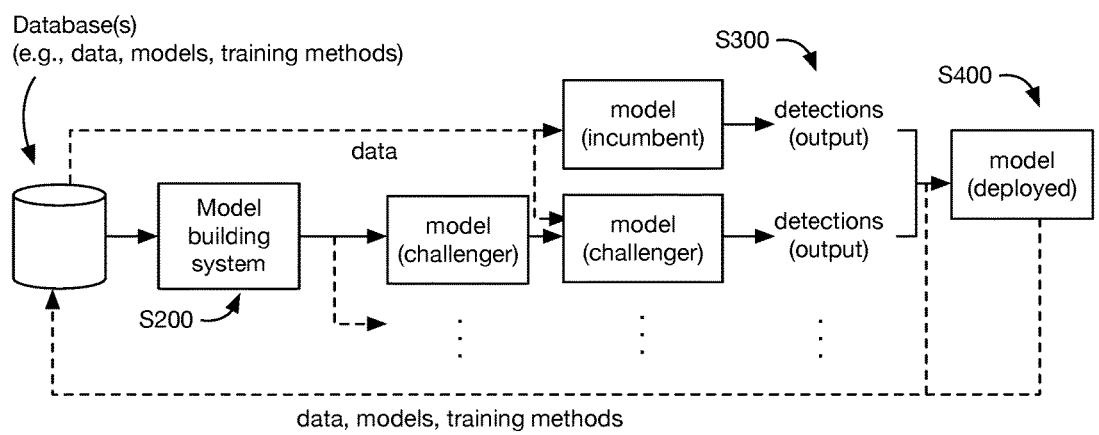
FIG. 12 is an example of using results of a past method iteration forward in a subsequent method iteration.

In a fifth variation, the data pool includes data underlying past detections (e.g., detected by an old model or incumbent model, detected by a candidate model or new model, etc.), and example of which is shown in FIG. 12. In an embodiment of this variation, the data pool includes data underlying positive detections (e.g., true for the class) and/or data underlying negative detections (e.g., false for the class), wherein the underlying data can be labeled with the detection type (e.g., true or false for the class) or unlabelled. The positive and negative detections are preferably true positive classifications and true negative classifications, but can additionally or alternatively be false positive classifications (e.g., labeled as a negative classification or "false" for the class) or false negative classifications (e.g., labeled as a positive classification or "true" for the class). The labels for each piece of data (or set thereof) can be determined as discussed above (e.g., based on a comparison between the detections output by the candidate model and the prior model, be manually assigned, etc.). In a specific example, data underlying events detected by both the candidate model and the prior model (common detections) can be labeled as true positives (e.g., "true" for the class), data that did not result in a detection by either the candidate model and the prior model can be labeled as a true negative (e.g., "false" for the class), and data underlying a detection by the prior model or the candidate model (but not both) can be labeled as false positives (e.g., "false" for the class), false negatives (e.g., "true" for the class), be sent to a client for manual labeling, or otherwise managed. In a specific example (example shown in FIG. 13), an event detected by a candidate model but not the prior model (delta detections) can be labeled as a false negative, and an event detected by a prior model (e.g., incumbent model) but not the candidate model (incumbent-only detections) can be labeled as a false positive (e.g., wherein the method can be biased toward using the candidate model detections as more accurate). However, the output comparison between the challenger model and incumbent models can be otherwise used.

Alternatively or additionally, the data pool can include data with new labels that should be associated with the class. In one variation, including data with new labels can include determining the new labels, identifying data in the source pool with the new labels, and aggregating the identified data into the data pool. In a first embodiment, determining the new labels can include: identifying raw data with geographic locations and/or timestamps proximal to a known event's geographic region and/or timestamp (e.g., wherein the known event is preferably a misclassified event, such as a false positive detection or a false negative detection); and extracting shared labels from the identified raw data, wherein the shared labels can be used as the new labels. In a second embodiment, determining the new labels can include: randomly selecting new labels or manually receiving new labels for inclusion in the data pool.

In a second variation, including data with new labels can include aggregating data into the data pool, then identifying the new labels based on the trained candidate model (e.g., by determining the labels associated with highly weighted factors within the model). In a first embodiment, aggregating the data can include: aggregating data with geographic locations and/or timestamps proximal to a known event's geographic region and/or timestamp (e.g., wherein the known event is preferably a misclassified event, such as a false positive detection or a false negative detection) into the data pool. In a second embodiment, aggregating the data can include: identifying the data underlying false positive and/or false negative detections in the prior model; labeling the data as with a negative or positive class detection, respectively; and including the labeled identified data within the data pool. However, the new data can be otherwise aggregated.

In a fifth variation, the data pool can include data modalities that are associated with the class. The data modality-class association can be determined from prior models for the class (e.g., modalities with the highest weighted factors), manually specified, or otherwise determined. For example, image and ambient environment data (e.g., weather data) can be aggregated into the data pool for a crop infestation event detector, while kinematic sensor data can be aggregated into the data pool for a collision event detector.

In a sixth variation, the data pool can include: only data that resulted in true positive and true negative detections for the detection class; distractors from deployed model for the detection class; data that caused false positive or negative detections in the deployed model; data similar to those causing false positive or negative detections, such as data sharing similar feature values or labels; randomly selected data, data labeled with labels associated with the detection class, data labeled with labels unassociated with the detection class (e.g., wherein the unassociated labels can be randomly or otherwise selected to encourage exploration), or any other suitable data.

In one embodiment, the false positive or false negative detections can be determined based on whether a predicted secondary event occurred and/or was detected within the respective occurrence window. A false positive detection can be determined when the secondary event is not detected (e.g., in subsequent raw data), wherein the data underlying the false positive detection can be associated with a non-class label (e.g., non-event classification) and included within the data pool. A false negative detection can be determined when one or more secondary events are detected (e.g., in subsequent raw data), wherein data associated with the false negative detection can be identified and included in the data pool. In one example, identifying the data associated with the false negative detection can include: determining an preceding geographic region associated with the anticipated, undetected preceding event (e.g., the succeeding detections' geographic regions); determining a preceding timeframe for the undetected preceding event; identifying historical data geotagged with locations within the preceding geographic location and associated with timestamps within the preceding timeframe; and labeling the identified historical data with the class label (e.g., associating the event class with the data). However, the false positive and/or negative detections can be manually determined, be determined using a secondary detection model (e.g., with higher accuracy), or otherwise determined and used.

In a seventh variation, the data pool can include data with a classification and/or label accuracy above a threshold accuracy or accuracy probability (e.g., above 99.8%).

However, the data pool can be limited using one or more of the aforementioned variants, or be otherwise constructed. In one example, the data pool for an event class can be: time limited (e.g., using a sliding window relative to a current time or concept drift timestamp, wherein the included data have timestamps within the sliding window), geographically limited (e.g., be associated with geographic locations within a geographic region associated with the event or candidate model), and label limited (e.g., include data labeled with labels associated with the event class). In a second example, the data pool is constructed similarly to the first example, and further includes distractors, as determined from the deployed model. However, the data pool can be otherwise constructed.

Generating data sets can optionally include: generating training data sets, which generates a data set for model training. The training data set can be limited to data from the data pool or include other data.

In a first variation, the training data set is generated in a similar manner to data pool generation.

In a second variation, the data included within the training data set is selected using information retrieval methods, edit distance, highest accuracy scores, highest variance in scores, distance from testing data (largest distances from testing data, smallest distances), clustering (k-means clustering, conceptual clustering, adaptive resonance theory), MAXNET, or otherwise selected.

In a third variation, the training data set is selected from the data pool (example shown in FIG. 6). In the third variation, the training set can be generated alongside testing data set generation, wherein the testing data set can also be selected from the data pool. The training data set is preferably separate and disjoint from the testing data set (e.g., wherein the data pool is segmented into the training data set and the testing data set), but can alternatively overlap with the testing data set. The training data set is preferably statistically related to the testing data set (e.g., has the same statistical distribution), but can be otherwise related to the testing data set. Examples of methods that can be used to generate (e.g., select) the training and/or testing data sets include: simulated annealing optimization, genetic algorithm-based approaches (generating a random data set with labels associated with the event class, then combining and mutating the random data set with objective functions), regression, data portioning (e.g., instance sampling, feature sampling, concurrent or sequential sample processing), using a fast algorithm, using relational representation, using complex representation, using stratified sampling, by generating related clusters (e.g., statistically related clusters) and sampling from the related clusters, or otherwise selected.

However, the training data set can be otherwise generated.

Generating data sets can optionally include generating testing data sets, which can be used to test the trained model (examples shown in FIG. 3 and FIG. 6). The testing data set can be generated concurrently or asynchronously from training data set generation, and can use the same or different source pool. The testing data set can have the same or different parameters (e.g., size, distribution, etc.) as the training data set. In a first variation, the testing data set is generated through the third variant for training data set generation. In a second variation, the testing data set is generated using one of the methods disclosed above for training data set generation. However, the testing data set can be otherwise generated.

Validating the candidate model S300 functions to measure the performance of the candidate models. S300 is preferably performed by the validation system, but can be otherwise performed. S300 is preferably performed after S200, but can alternatively be performed after a threshold number of challengers for the deployed model have been generated, or be performed at any suitable time. S300 is preferably automatically performed, but can alternatively be manually performed. S300 is preferably performed using the trained candidate model (output by S200) and a training data set, but can alternatively be performed using a real data set (e.g., representative of data fed to the corresponding deployed model), using a second model (e.g., a higher-accuracy model run on the same test data), or performed using any other suitable data. The generated metrics are preferably one or more of the evaluation metrics, but can alternatively be other metrics.

S300 can optionally include determining differences between the prior model (incumbent model) and candidate model(s) (challenger model), which can be used to: determine which candidate models are deployed; determine which candidate models should be regenerated; contribute data (e.g., labeled data) to the source pools for subsequent training iterations; determine the training method to use in subsequent training iterations; determine the seed model to use in subsequent training iterations; or otherwise used. Examples of differences that can be determined include: incumbent-only detections detected by the prior model (e.g., detected by the prior model but undetected by the candidate model), delta detections detected by the candidate model (e.g., detected by the candidate model but undetected by the prior model), common detections detected by both the prior and candidate model, true negatives detected by both the prior and candidate model (e.g., not detected by either model), the entire population of potential events detected by the models, or and/or any other suitable metric. In a specific example, the incumbent-only detections can be treated as false positive detections (e.g., and/or sent to subsequent verification processes, such as manual verification processes, to determine whether they truly are false positives); the common detections are treated as true positives (e.g., verified using prior model results; used in subsequent candidate model training iterations; etc.); and the delta detections can be sent to subsequent verification processes (e.g., manual verification processes, validation using secondary model detections, etc.) and/or treated as false positives. However, the differences can be otherwise used.

Deploying the candidate model into a production environment S400, functions to run the candidate model on real world data, and can optionally replace the prior model. In variants, this can function to deploy a new model that is better suited to detecting events, despite the concept drift. The candidate model is preferably deployed when the deployment conditions (criteria) are met, but can be deployed at any suitable time. The deployment conditions can be the same for all classes and/or models, but can alternately be different for different classes, models, geographic regions, or any other suitable population segmentation. The deployment conditions are preferably cutoff values for a set of evaluation metrics, but can additionally or alternatively include a deployment schedule, be satisfied when S200 generates a new model, or be any other suitable condition.

The deployment conditions can be manually determined, determined based on prior model performance (currently deployed models for the class, historic models for the class), detection class (e.g., event class), data modality, the model type, or otherwise determined. In one example, classes with severe detection repercussions or more subscribers can have more stringent deployment conditions, while classes with less severe detection repercussions can have less stringent deployment conditions (e.g., lower deployment thresholds). In a second example, deployment cutoff values (e.g., accuracy thresholds) can be lowered when the deployed model is performing below a threshold level (as determined based on evaluation metrics for the deployed model). In a third example, the deployment conditions for text models can require: 80% or higher precision and maximum recall, while the deployment conditions for image-based models can require minimal recall but maximal precision. In a fourth example, first event class may require higher recall or sensitivity because the first event class is close to a common event class, while a second event class is rare enough that recall can be weighted lower. However, the deployment conditions can be otherwise determined.

In a first variation, the candidate model can be deployed when the candidate model's evaluation metrics exceed a threshold value. The threshold value can be a static value, the values for one or more evaluation metrics for the deployed model (e.g., wherein the considered evaluation metrics can be based on the data modality, the class, the model type, or otherwise determined), or be any other suitable threshold value. In one example, the candidate model is deployed when the respective precision or accuracy exceeds a threshold value (e.g., 99.8%) when run on the testing data set. In a second example, the candidate model is deployed when the candidate model performs better than the deployed model (e.g., when run on the same data set, such as recently ingested data or the testing data set).

In a second variation, the candidate model can be deployed when a second, higher-accuracy model agrees with the candidate model for a threshold number of detections. However, the candidate model can be deployed at any suitable time.

However, the deployment conditions can be otherwise satisfied.

Candidate models are preferably deployed one at a time (e.g., across the entire system), but multiple candidate models can be concurrently deployed for a single class or multiple classes. In the latter instance, the performance of the multiple candidate models within the production environment for a given class can be monitored, and the best candidate model can be selected from the multiple candidate models based on the models' respective performances.

In a first variation, deploying the candidate model into the production environment can include deploying the candidate model in parallel with the prior model. The candidate model can be deployed to the same or different population segment as the previously deployed model for the same class. Additionally or alternatively, different candidate model can be selectively deployed to select population segments, such as specific geographic regions, data sources, demographics, or modalities. In the latter instance, the models can be specifically generated for that population segment (e.g., trained on data from that population segment). Alternatively, the models be temporarily assigned to that population segment for A/B testing or other comparison of one or more trained model variants, wherein the top performer (according to one or more evaluation metrics) can be selected based on real-world performance and globally applied.

In a second variation, deploying the candidate model includes replacing the prior model. The prior model can be replaced: automatically, upon candidate model deployment; when replacement conditions are met; or at any suitable time. The replacement metrics within the replacement conditions can be the same set, an overlapping set, or a disjoint set from the deployment condition set. The replacement conditions are preferably more stringent than the deployment conditions (e.g., have a higher threshold value), but can alternatively be less stringent.

However, the candidate model(s) can be deployed using a combination of the above, or otherwise deployed.

The method can optionally include monitoring the deployed model performance S800, which functions to generate metric values that can be used to trigger model re-generation and serve as a baseline for new model evaluation. The model performance can be used to trigger subsequent method iterations, to trigger model retraining for a given class, to define subsequent data pool requirements or parameters for subsequent model training (e.g., the given class, for a related class), to select seed models for subsequent training, or otherwise used. Monitoring deployed model performance can include: tracking conversion rates, determining model accuracy (e.g., using subsequent manual review, using subsequent detections of predicted associated events, etc.), or otherwise monitoring model performance.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:
1. A computer-implemented method comprising:
labeling raw data from a set of data sources;
detecting a concept drift rate for a geographic region from the raw data;
detecting an occurrence of an event class at a deployed event detection model based on features of the raw data;
identifying labeled raw data associated with the event class;
segmenting the identified labeled raw data into a training data set and a testing data set;
training a seed model with the training data set generating an event class candidate model specific to the geographic region in response to detecting the concept drift rate by determining candidate model evaluation metric values using the testing data set;
in response to the candidate model evaluation metric values satisfying a set of deployment conditions, deploying the event class candidate model; and detecting a subsequent occurrence of the event class based on subsequent raw data received from the set of data sources, using the event class candidate model.

2. The method of claim 1, further comprising transmitting a notification to an endpoint associated with the event class in response to detecting the occurrence of the event class; and wherein segmenting the identified labeled raw data into a training data set and a testing data set comprises segmenting the identified raw data into a training data set that is disjoint from the testing data set.

3. The method of claim 1, computing a concept drift rate comprise computing the concept drift rate from change in an inaccuracy rate of the deployed event detection model.

4. The method of claim 3, further comprising determining the inaccuracy rate of the deployed event detection model based on whether an expected subsequent event occurs within a predetermined time interval after detecting a precursor event associated with the event class.

5. The method of claim 1, wherein labeling raw data from a set of data sources comprises labeling raw data by a labeling model; and further comprising:

extracting secondary features from secondary training data, wherein the secondary training data is pre-associated with the label; and training a seed labeling model to algorithmically arrive at a label.

6. A computer-implemented method, comprising:

detecting a concept drift rate from a geographic region from raw data;

identifying labeled data including labels pre-associated with an event class;

segmenting the labeled data into a training data set and testing data set;

training a seed model specific to the geographic region and in response to detecting the concept drift rate with the training data set to generate a candidate model for the event class;

determining evaluation metrics for the candidate model using the testing data set;

detecting an occurrence of the event class based on raw data received from a set of data sources using the candidate model;

identifying other raw data geotagged with geographic locations within the geographic region;

determining feature values from the other raw data; and detecting an occurrence of an event based on the feature values.

7. The method of claim 6, wherein detecting an occurrence of an event comprises detecting one or more of: an event start time, an event end time, or an event location.

8. The method of claim 6, wherein identifying labeled data comprises identifying labeled data derived from the raw data.

9. The method of claim 6, wherein identifying labeled data comprises identifying one or more of: image data, text data, video data, or audio data.

10. The method of claim 6, further comprising deploying the candidate model to a production environment to replace a previously deployed model within the production environment.

11. A computer system comprising:

a processor;

system memory coupled to the processor and storing instructions configured to cause the processor to:

label raw data from a set of data sources;

detect a concept drift rate for a geographic region from the raw data;

detect an occurrence of an event class at a deployed event detection model based on features of the raw data;

identify labeled raw data associated with the event class;

segment the identified labeled raw data into a training data set and a testing data set;

train a seed model with the training data set generating an event class candidate model specific to the geographic region in response to detecting the concept drift rate;

determine candidate model evaluation metric values using the testing data set;

in response to the candidate model evaluation metric values satisfying a set of deployment conditions, deploy the event class candidate model; and detect a subsequent occurrence of the event class based on subsequent raw data received from the set of data sources, using the event class candidate model.

12. The computer system of claim 11, further comprising instructions configured to transmit a notification to an endpoint in response to detecting the occurrence of the event class; and wherein instructions configured to segment the identified labeled raw data into a training data set and a testing data set comprise instructions configured to segment the identified raw data into a training data set that is disjoint from the testing data set.

13. The computer system of claim 11, wherein instructions configured to detect a concept drift rate comprise instruction configured to detect the concept drift rate from change in an inaccuracy rate of the deployed event detection model; and wherein instructions configured to generate an event class candidate model comprise instructions configured to generate an event class candidate model automatically in response to detecting the concept drift rate.

14. The computer system of claim 13, further comprising instructions configured to determine the inaccuracy rate of the deployed event detection model based on whether an expected subsequent event occurs within a predetermined time interval after detecting a precursor event associated with the event class.

15. The computer system of claim 11, wherein instructions configured to label raw data from a set of data sources comprise instructions configured to label the raw data; and further comprising instructions configured to cause the processor to:

extract secondary features from secondary training data, wherein the secondary training data is pre-associated with a label; and train a seed labeling model to algorithmically arrive at the label.

16. A computer system comprising:

a processor;

system memory coupled to the processor and storing instructions configured to cause the processor to:

identify labeled data including labels pre-associated with an event class;

segment the labeled data into a training data set and a testing data set that is disjoint from the training data set;

train a seed model with the training data set to generate a candidate model for the event class;

determine evaluation metrics for the candidate model using the testing data set;

detect an occurrence of the event within an event detection system class based on raw data received from a set of data sources using the candidate model;

transmit a notification to an endpoint in response to detecting the occurrence of the event;

identify other raw data geotagged with geographic locations within a geographic region;

determine feature values from the other raw data; and detect an occurrence of an event based on the feature values.

17. The computer system of claim 16, further comprising instructions configured to detect concept drift associated with the event class.

18. The computer system of claim 16, wherein instructions configured to identify labeled data comprise instructions configured to cause the processor to identify one or more of: image data, text data, video data, or audio data.

19. The computer system of claim 16, further comprising instructions configured to detect a concept drift draft rate from raw data; and wherein instructions configured to generate a candidate model comprises instructions configured to generate a candidate model in response to detecting the concept drift rate.

20. The computer system of claim 19, wherein instructions configured to identify labeled data comprise instructions configured to identify labeled data derived from the raw data.

* * * * *